United States Patent
Watanabe et al.

(10) Patent No.: US 9,368,999 B2
(45) Date of Patent: Jun. 14, 2016

(54) WIRELESS CHARGING STRUCTURE FOR MOBILE INFORMATION TERMINAL IN VEHICLE

(71) Applicant: HONDA MOTOR CO., LTD., Tokyo (JP)

(72) Inventors: Tsuguo Watanabe, Wako (JP); Yasumasa Matsui, Wako (JP); Daisuke Kuriki, Wako (JP); Tetsuaki Maeda, Wako (JP); Yoshihide Yuza, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 389 days.

(21) Appl. No.: 13/854,138

(22) Filed: Apr. 1, 2013

(65) Prior Publication Data
US 2013/0307470 A1 Nov. 21, 2013

(30) Foreign Application Priority Data

May 16, 2012 (JP) .................................. 2012-112574

(51) Int. Cl.
| | |
|---|---|
| *H02J 7/00* | (2006.01) |
| *H02J 7/14* | (2006.01) |
| *H02J 7/02* | (2016.01) |
| *B60R 11/02* | (2006.01) |
| *B60L 11/18* | (2006.01) |
| *B60R 11/00* | (2006.01) |

(52) U.S. Cl.
CPC ................ *H02J 7/025* (2013.01); *B60R 11/02* (2013.01); *H02J 7/0044* (2013.01); *B60L 11/182* (2013.01); *B60R 2011/0071* (2013.01); *B60R 2011/0073* (2013.01); *B60R 2011/0078* (2013.01); *B60R 2011/0089* (2013.01)

(58) Field of Classification Search
USPC ......... 320/104, 108, 101, 103, 107, 109, 114, 320/115, 137, 138, 139; 307/9.1, 10.1; 224/413, 929, 276, 400, 419, 435
See application file for complete search history.

(56) References Cited

U.S. PATENT DOCUMENTS

| | | | | |
|---|---|---|---|---|
| 5,319,803 | A * | 6/1994 | Allen | 455/566 |
| 6,783,040 | B2 * | 8/2004 | Batchelor | 224/413 |
| 7,594,631 | B1 * | 9/2009 | Carnevali | 248/219.4 |
| 8,496,144 | B2 * | 7/2013 | Son | 224/276 |
| 8,505,792 | B1 * | 8/2013 | Jansen | 224/276 |
| 8,955,728 | B2 * | 2/2015 | Schultze | 224/413 |

(Continued)

FOREIGN PATENT DOCUMENTS

JP 2005-104258 4/2005

*Primary Examiner* — Alexis A Boateng
(74) *Attorney, Agent, or Firm* — Mori & Ward, LLP

(57) ABSTRACT

A wireless charging structure to wirelessly charge a mobile information terminal in a vehicle includes a mobile information terminal case, a support, a receiving coil, a reception controller, a transmitting coil, and a transmission controller. The transmitting coil is provided on a vehicle side and provided on an inner side of a facing portion of the support. The transmission controller is provided on the vehicle side and electrically connected to the transmitting coil. The transmission controller includes an inverter configured to convert direct current supplied from a battery provided on the vehicle side to alternating current and to supply the alternating current to the transmitting coil. The reception controller includes a converter configured to convert alternating current flowing through the receiving coil due to the magnetic flux generated by the transmitting coil to direct current.

20 Claims, 25 Drawing Sheets

(56) References Cited

U.S. PATENT DOCUMENTS

| | | | |
|---|---|---|---|
| 2002/0158512 A1* | 10/2002 | Mizutani | B60K 37/02 307/9.1 |
| 2004/0095092 A1* | 5/2004 | Ta-Shuo | H02J 7/1407 320/104 |
| 2005/0067203 A1* | 3/2005 | Uno | 180/65.5 |
| 2007/0029359 A1* | 2/2007 | Smith | 224/276 |
| 2009/0284341 A1* | 11/2009 | Okada | H04B 1/3883 336/232 |
| 2010/0294818 A1* | 11/2010 | LaFargue et al. | 224/400 |
| 2010/0320341 A1* | 12/2010 | Baumann | B60R 11/0241 248/206.2 |
| 2011/0291614 A1* | 12/2011 | Yeh | B60R 11/02 320/108 |
| 2012/0013294 A1* | 1/2012 | Yeh | 320/108 |
| 2012/0168482 A1* | 7/2012 | Dugan | 224/567 |
| 2013/0234660 A1* | 9/2013 | Moriguchi | 320/108 |
| 2014/0167438 A1* | 6/2014 | Lambert et al. | 296/24.34 |
| 2014/0232343 A1* | 8/2014 | Tadd et al. | 320/114 |

* cited by examiner

WIRELESS CHARGING STRUCTURE FOR MOBILE INFORMATION TERMINAL IN VEHICLE

CROSS-REFERENCE TO RELATED APPLICATIONS

The present application claims priority under 35 U.S.C. §119 to Japanese Patent Application No. 2012-112574, filed May 16, 2012. The contents of this application are incorporated herein by reference in their entirety.

BACKGROUND OF THE INVENTION

1. Field of the Invention

The present invention relates to a wireless charging structure for a mobile information terminal in a vehicle.

2. Discussion of the Background

Japanese Patent Application Publication No. 2005-104258 discloses a bicycle in which a charger for a mobile phone is attached to a handle pipe.

Moreover, a technology of wirelessly charging a mobile information terminal such as the mobile phone described above has been recently attracting attention.

SUMMARY OF THE INVENTION

According to one aspect of the present invention, a wireless charging structure to wirelessly charge a mobile information terminal in a vehicle includes a mobile information terminal case, a support, a receiving coil, a reception controller, a transmitting coil, and a transmission controller. The mobile information terminal case is to cover the mobile information terminal. The support is provided on a vehicle side to support the mobile information terminal case. Current is to flow along with a passage of magnetic flux through the receiving coil. The receiving coil is provided inside an outer wall of the mobile information terminal case. The reception controller is provided inside the outer wall of the mobile information terminal case and electrically connected to the receiving coil. Current is to flow to generate magnetic flux through the transmitting coil. The support includes a facing portion provided to face the receiving coil in a state where the mobile information terminal case is supported by the support. The transmitting coil is provided on the vehicle side and provided on an inner side of the facing portion of the support. The transmission controller is provided on the vehicle side and electrically connected to the transmitting coil. The transmission controller includes an inverter configured to convert direct current supplied from a battery provided on the vehicle side to alternating current and to supply the alternating current to the transmitting coil. The reception controller includes a converter configured to convert alternating current flowing through the receiving coil due to the magnetic flux generated by the transmitting coil to direct current.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
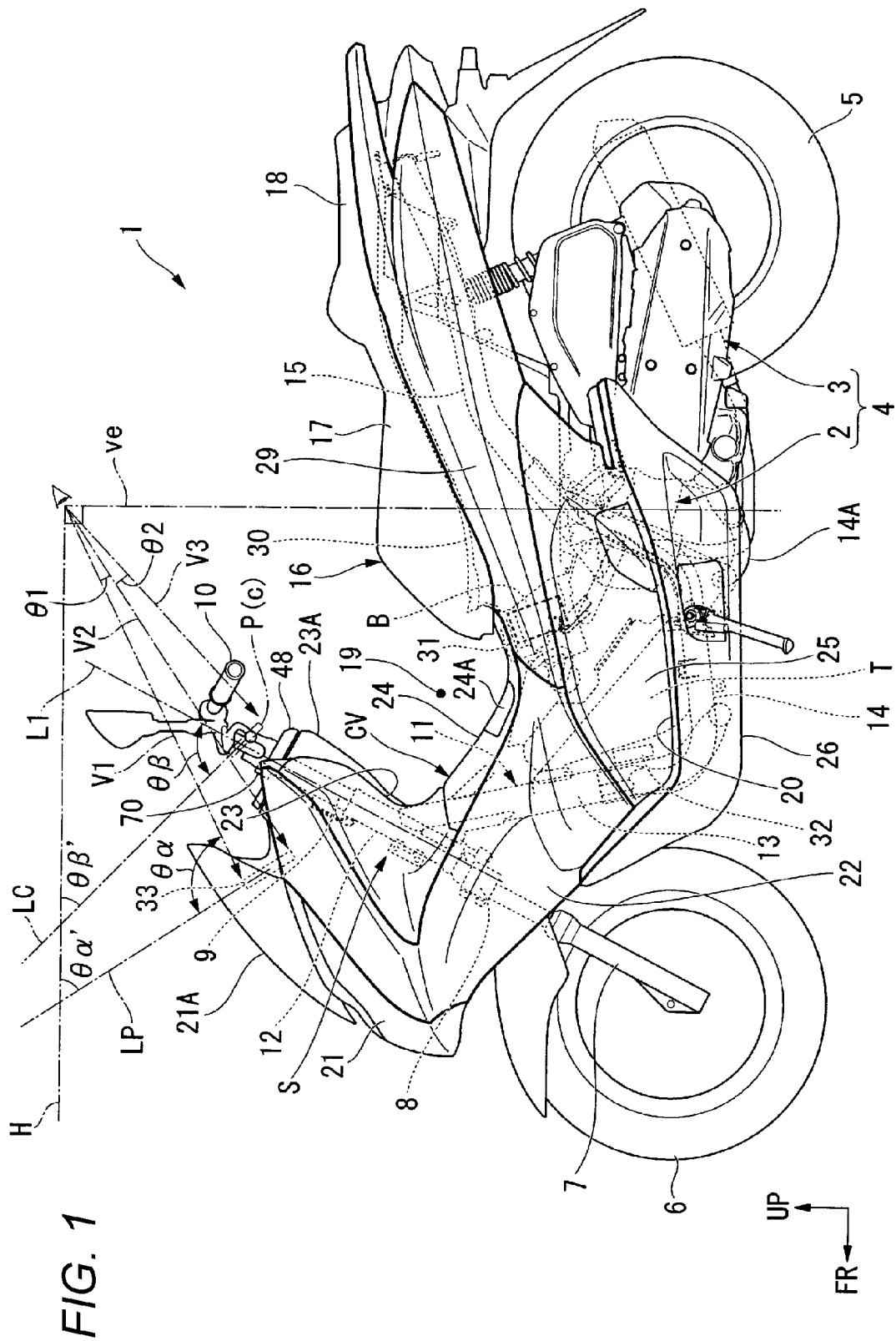
FIG. 1 is a left-side view of a motorcycle in an embodiment of the present invention.

The embodiments will now be described with reference to the accompanying drawings, wherein like reference numerals designate corresponding or identical elements throughout the various drawings.

In the drawings used below, the arrow FR indicates frontward of a vehicle, the arrow UP indicates upward of the vehicle, and the arrow LH indicates leftward of the vehicle.

FIG. 1 shows a scooter type motorcycle 1 to which an embodiment of the present invention is applied. The motorcycle 1 includes a swing unit 4 in which an engine 2 and a power transmission mechanism 3 are integrated. A rear wheel 5 is rotatably supported by a rear portion of the swing unit 4 and a front wheel 6 forming a steering system S is disposed in front of the swing unit 4. The front wheel 6 is rotatably supported by lower portions of paired left and right front forks 7, 7. A bridge 8 is laid between upper portions of the left and right front forks 7, 7 and a steering shaft 9 stands at the center of the bridge 8 in a vehicle width direction.

A handle pipe 10 is provided above the steering shaft 9. The handle pipe 10 is formed of a single pipe member extending in the vehicle width direction. The steering system S in the embodiment is formed mainly of the front wheel 6, the front forks 7, 7, the steering shaft 9, the handle pipe 10, and the like. The reference sign L1 in the drawings denotes a steering axis of the steering system S.

The steering shaft 9 is turnably supported by a head pipe 12 provided at a front end of a vehicle body frame 11 formed by integrating multiple frame members by welding and the like. The vehicle body frame 11 of the vehicle includes: the head pipe 12; a main frame 13 which extends downward from the head pipe 12; paired left and right side frames 14, 14 which are connected to a side surface of a lower portion of the main frame 13 and which extend rearward and then upward and rearward; and paired left and right seat frames 15, 15 which are connected respectively to upper ends of the side frames 14, 14 and extend upward and rearward. To be precise, the main frame 13 is slightly inclined with respect to the vertical direction and extends downward and rearward from the head pipe 12.

The swing unit 4 is supported by rear lower portions of the side frames 14, 14 via a link member 14A and can swing in an up-down direction. A seat 16 on which a rider is seated is disposed above the swing unit 4. The seat 16 extends in a front-rear direction and is formed by integrally including a main seat 17 on which a driver is seated and a pillion seat 18 on which a passenger is seated.

The motorcycle 1 is covered with a vehicle body cover CV formed of multiple cover members made of resin material. A front cover 21 is disposed above the front wheel 6 and in front of the head pipe 12. Paired left and right front side covers 22, 22 are continuous respectively with rear edge portions of both side portions of the front cover 21, the front side covers 22, 22 each having such an L shape that a corner portion is arranged on the front side in a side view. The front side covers 22, 22 are each formed in such a shape that one edge of the L shape is continuous with a corresponding one of the rear edge portions of both side portions of the front cover 21 and another edge of the L shape extends rearward.

The front cover 21 is formed in a streamline shape tapered toward the front of the vehicle in a top view. A notch gradually tapered from the rear to the front along the center line in the vehicle width direction is formed in an upper portion of the front cover 21 and a screen 21A is provided in the notch. The screen 21A is fixed to an edge portion and the like of the notch of the front cover 21 and stands upward and rearward from the front to the rear in the side view and travelling wind from the front is made to flow upward and rearward by the screen 21A. Moreover, the front cover 21 integrally includes a headlight and left and right turn signals.

A space between rear portions of the left and right front side covers 22, 22 is covered with an upper inner cover 23 and a lower inner cover 24 which extend in the vehicle width direction. A rear wall portion of the upper inner cover 23 extends in the up-down direction along the steering shaft 9 and a lower end of the rear wall portion is located behind a lower end of the head pipe 12. Meanwhile, the lower inner cover 24 is continuous with the lower end of the rear wall portion of the upper inner cover 23 and extends rearward and a rear end of the lower inner cover 24 is located close to and in front of a front end of the seat 16.

A bulging portion 23A bulging rearward is formed in a vehicle-width-direction center region of an upper portion of the rear wall portion of the upper inner cover 23. The bulging portion 23A has an arc shape following an outer peripheral surface of the steering shaft 9, outside the steering shaft 9 in a radial direction thereof. Moreover, a fuel tank T is disposed below the lower inner cover 24 and a fuel filler lid 24A for opening a fuel filler of the fuel tank T which is not illustrated to the outside is provided in the lower inner cover 24 to be openable and closable.

A step-through space 19 for the rider to step through when getting on and off the motorcycle is formed in front of the seat 16 and above the lower inner cover 24. The driver gets on the motorcycle 1 by stepping through the step-through space 19 and then placing his/her feet on left and right step floors 20, 20 while being seated on the seat 16, the step floors 20, 20 provided in a lower center portion of the vehicle body in the front rear direction. Here, the step floors 20, 20 are provided integrally with paired left and right lower covers 25, 25 which are continuous with lower portions of the front side covers 22, 22 and which extend rearward. The lower covers 25, 25 extend to positions above the swing unit 4.

Paired left and right under cowls 26, 26 are provided below the lower covers 25, 25. A space between the seat 16 and each of the lower covers 25, 25 is covered with a corresponding one of paired left and right rear side covers 29, 29 whose front ends are continuous with rear ends of the front side covers 22, 22 and which extend rearward.

A storage box 30 is provided below the seat 16, between the left and right rear side covers 29, 29. The seat 16 is supported by the storage box 30 and is capable of closably opening the storage box 30 from the rear by turning the seat 16 about a front end thereof. Moreover, a battery housing portion 31 is provided in a front end portion of the storage box 30 and a battery B is housed in the battery housing portion 31. Furthermore, an engine control unit (hereafter, referred to as ECU) 32 is provided behind a lower portion of the main frame 13. The ECU 32 is a control device that performs operations such as obtaining information of various sensors and the like installed in the vehicle and controls a fuel injection amount of the engine for example.

Figure 2:
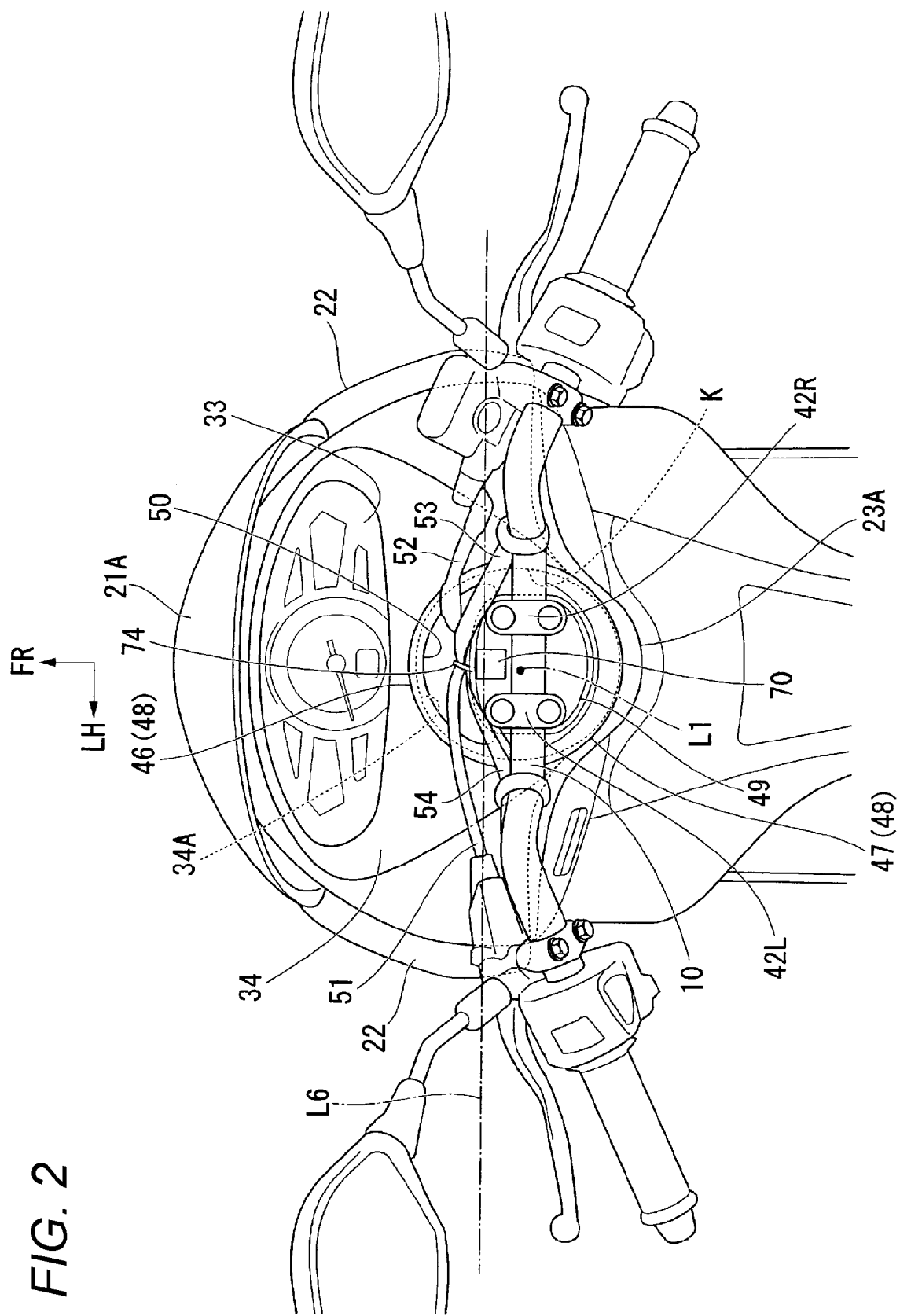
FIG. 2 is a bird's eye view looking down at a portion around a handle pipe of the motorcycle from above the vehicle in an oblique frontward and downward direction.

Next, FIG. 2 is a top view of an area around the handle pipe 10 and shows an instrument panel 33 which is disposed between the handle pipe 10 and the screen 21A and which includes various instruments such as a speedometer. The instrument panel 33 is supported by a plate-shaped front inner panel 34 covering a space surrounded by upper portions of the left and right front side covers 22, 22 and the screen 21A, in such a way that a display surface of the instrument panel 33 is exposed from an opening formed in the front inner panel 34.

A notch portion 34A recessed frontward is formed in a vehicle-width-direction center portion of a rear portion of the front inner panel 34. The notch portion 34A has an arc shape following the outer peripheral surface of the steering shaft 9, outside the steering shaft 9 in the radial direction thereof. Left and right end portions of the notch portion 34A come in contact with left and right end portions of the bulging portion 23A of the upper inner cover 23 and a circular space K is formed by the notch portion 34A and the bulging portion 23A. Referring also to FIG. 1, an upper end portion of the steering shaft 9 protrudes upward from the space K and the handle pipe 10 is fixed to the steering shaft 9 above the space K.

Figure 3:
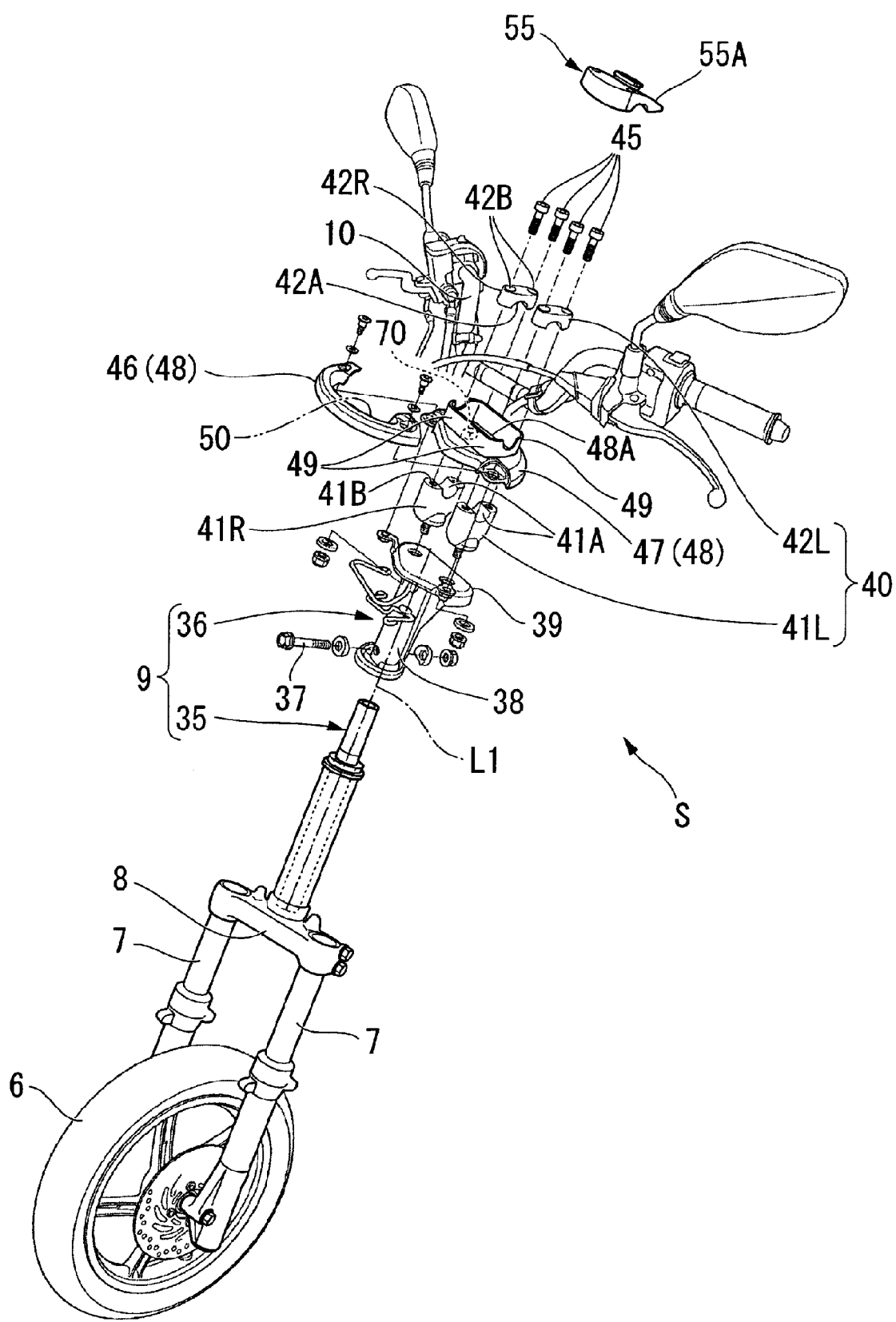
FIG. 3 is an exploded perspective view of a steering system of the motorcycle.

FIG. 3 is an exploded perspective view of the steering system S. In the embodiment, the steering shaft 9 includes a shaft main body 35 inserted in the head pipe 12 to be turnably supported and a handle post 36 connected to an upper portion of the shaft main body 35 which protrudes upward from the head pipe 12 in the shaft main body 35. The handle post 36 includes a tube portion 38 and a rectangular stay portion 39. The upper portion of the shaft main body 35 is inserted in the tube portion 38 and the tube portion 38 is connected to the shaft main body 35 with a bolt 37 to be unrotatable. The stay portion 39 is connected to the tube portion 38 to cover an upper end thereof and extends to both sides in the vehicle width direction.

The handle pipe 10 is fixed with a handle holder 40 fixed to the stay portion 39. In the embodiment, the handle holder 40 includes: paired left and right lower holders 41L, 41R fixed to an upper surface of the stay portion 39 and protruding upward; and paired left and right upper holders 42L, 42R brought into contact with the lower holders 41L, 41R from above and used to fix the handle pipe 10 by interposing the handle pipe 10 between the upper holders 42L, 42R and the lower holders 41L, 41R. The lower holder 41L and the upper holder 42L are disposed on the left side of the steering axis L1 in the stay portion 39 while the lower holder 41R and the upper holder 42R are disposed on right side thereof.

Arc-shaped handle receiving portions 41A, 41A recessed downward to allow the handle pipe 10 to be placed thereon are formed respectively in upper portions of the lower holders 41L, 41R and bolt fastening holes 41B . . . are formed on both sides of each of the handle receiving portions 41A, 41A. Meanwhile, arc-shaped handle contact portions 42A, 42A recessed upward to press down the handle pipe 10 are formed respectively in lower portions of the upper holders 42L, 42R and penetrating holes 42B . . . aligned with the bolt fastening holes 41B . . . are formed on both sides of each of the handle contact portions 42A, 42A.

Bolts 45 to be fastened to the bolt fastening holes 41B . . . are inserted into the penetrating holes 42B . . . and the bolts 45 inserted into the penetrating holes 42B . . . are then fastened to the bolt fastening holes 41B . . . with the handle contact portions 42A, 42A in contact with the handle pipe 10. The upper holders 42L, 42R thereby fixes the handle pipe 10 in cooperation with the lower holders 41L, 41R.

In the embodiment, a handle cover 48 formed in a circular plate shape by connecting a front half 46 and a rear half 47 to each other is fixed to the stay portion 39 of the handle post 36. Referring also to FIG. 2, the handle cover 48 covers the upper surface of the stay portion 39 from above. The rear half 47 is formed in a semicircular shape in the top view and is fitted to the stay portion 39 from above. A through hole 48A through which the left and right lower holders 41L, 41R are inserted is formed in the rear half 47 and a peripheral wall portion 49 surrounding the lower holders 41L, 41R is formed at an outer peripheral edge of the through hole 48A. Moreover, notches for avoiding interference with the handle pipe 10 are formed in left and right portions of the peripheral wall portion 49.

When the rear half 47 is fitted to the stay portion 39, the lower holders 41L, 41R extend through the through hole 48A and upper portions thereof are exposed to the outside from an upper end opening of the peripheral wall portion 49. On the other hand, the front half 46 is formed in an arc shape and both end portions thereof are fastened to left and right end portions of the rear half 47. As shown in FIG. 2, in the state where the front half 46 and the rear half 47 are connected to each other, an outer shape of the front half 46 and the rear half 47 is circular and a gap is provided between a rear edge of the front half 46 and a front edge of the rear half 47. This gap functions as a routing hole 50 into which various cables are inserted. Here, the front edge of the rear half 47 protrudes frontward in an arc shape and both end portions of the front half 46 are connected to portions of the rear half 47 on both sides of the portion protruding in the arc shape. The routing hole 50 has an arc shape (crescent shape). In FIG. 3, the routing hole 50 is indicated by a two-dot chain line for the convenience of description. Moreover, although the handle cover 48 is formed of two members of the front half 46 and the rear half 47 in the embodiment, the handle cover 48 may be formed of one circular member provided with the routing hole 50 as described above.

Returning to FIG. 2, the handle cover 48 is disposed close to edge portions of the notch portion 34A and the bulging portion 23A in an up-down direction, above the circular space K formed by the notch portion 34A and the bulging portion 23A. The handle cover 48 covers a portion of the steering system S below the handle holder 40 from above. Moreover, various cables such as front and rear brake cables 51, 52, a throttle cable 53, and a handle switch cable 54 are made to run through the routing hole 50 of the handle cover 48 and the multiple cables are thus grouped together. The handle switch cable 54 is a cable used to output signals from a switch box provided on the handle pipe 10 to the ECU 32 and the like. Moreover, the front and rear brake cables 51, 52 and the like are made to run on the front side of the steering shaft 9 and guided to appropriate portions of the vehicle.

Figure 4:
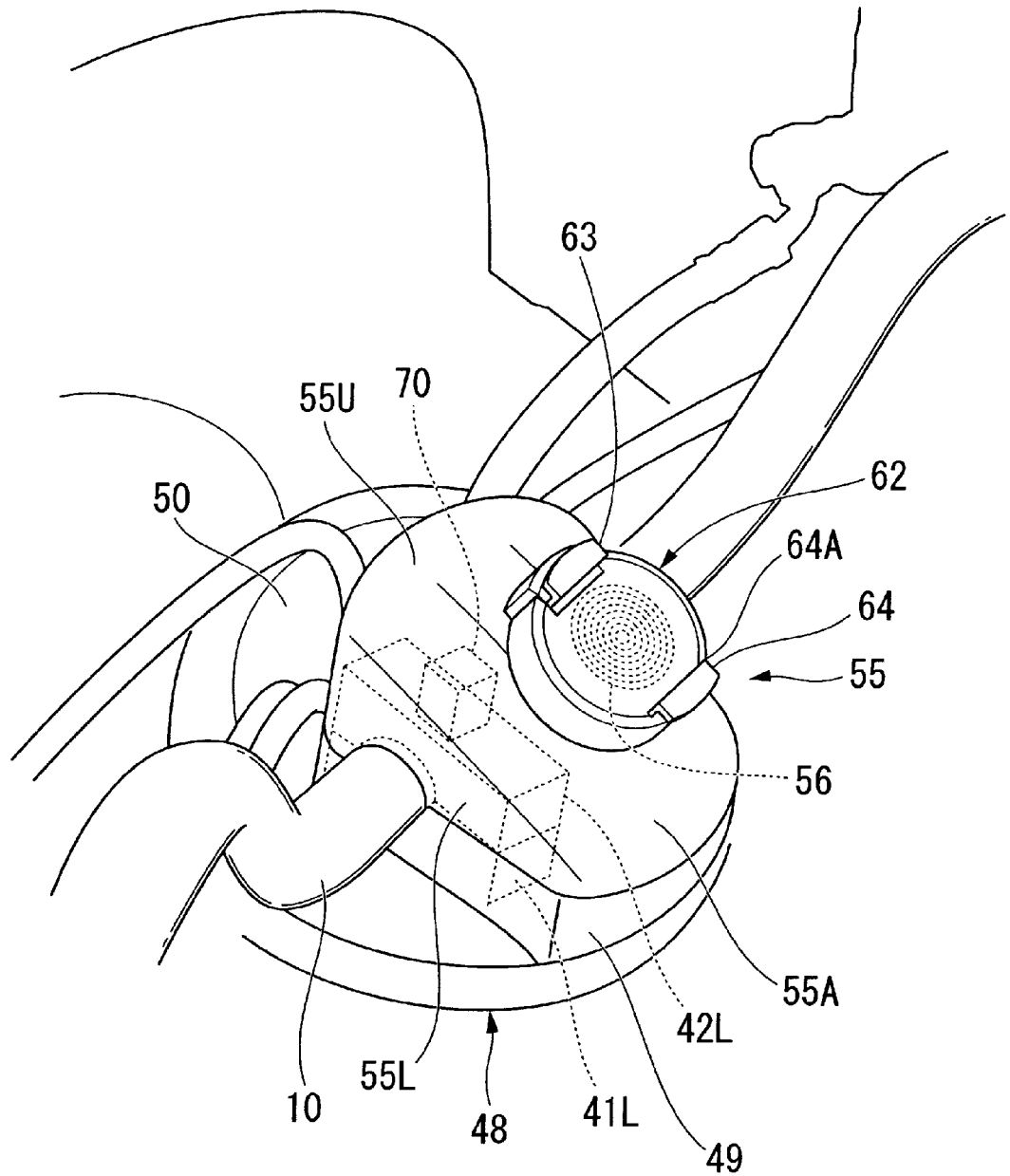
FIG. 4 is a perspective view of a mobile terminal holder of the motorcycle.
Figure 5:
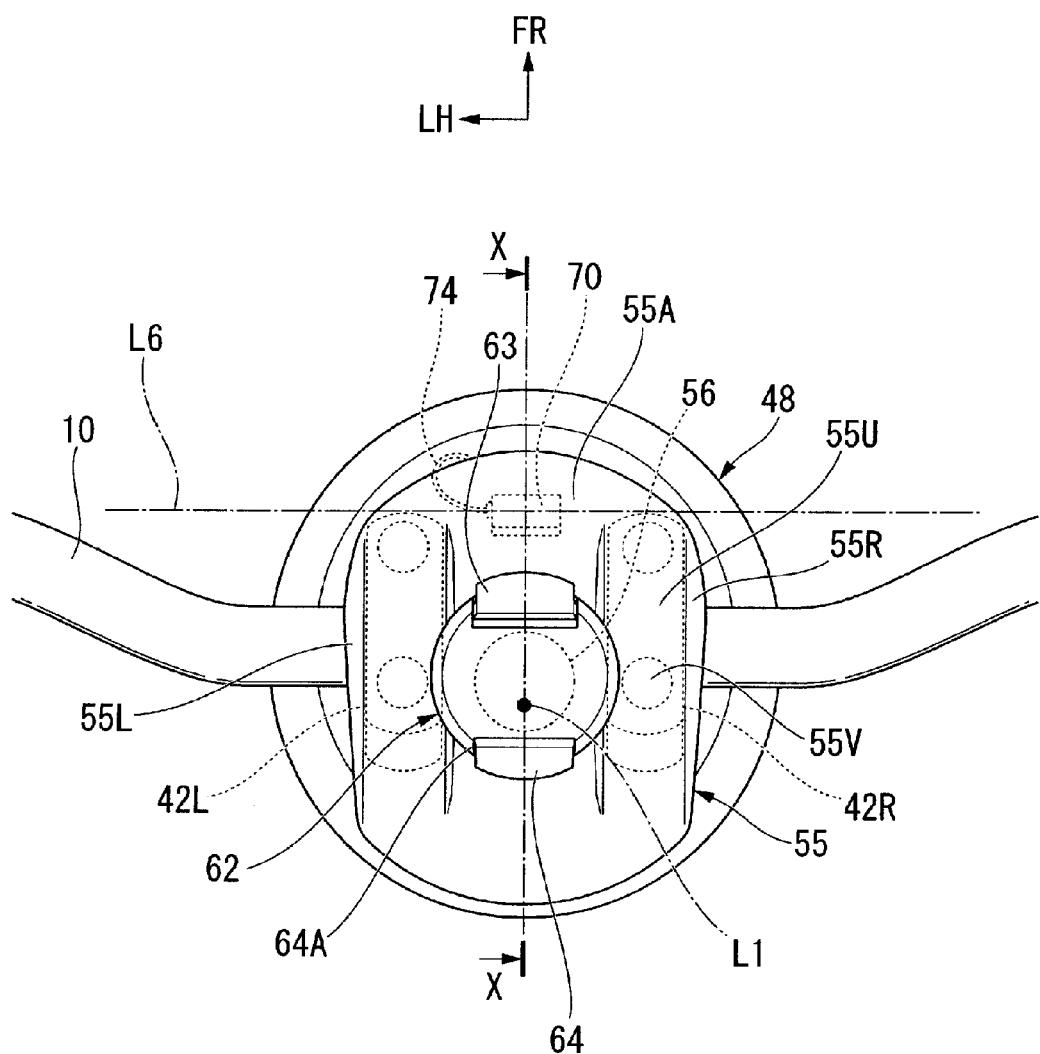
FIG. 5 is a view looking down at the mobile terminal holder of the motorcycle from above.
Figure 6:
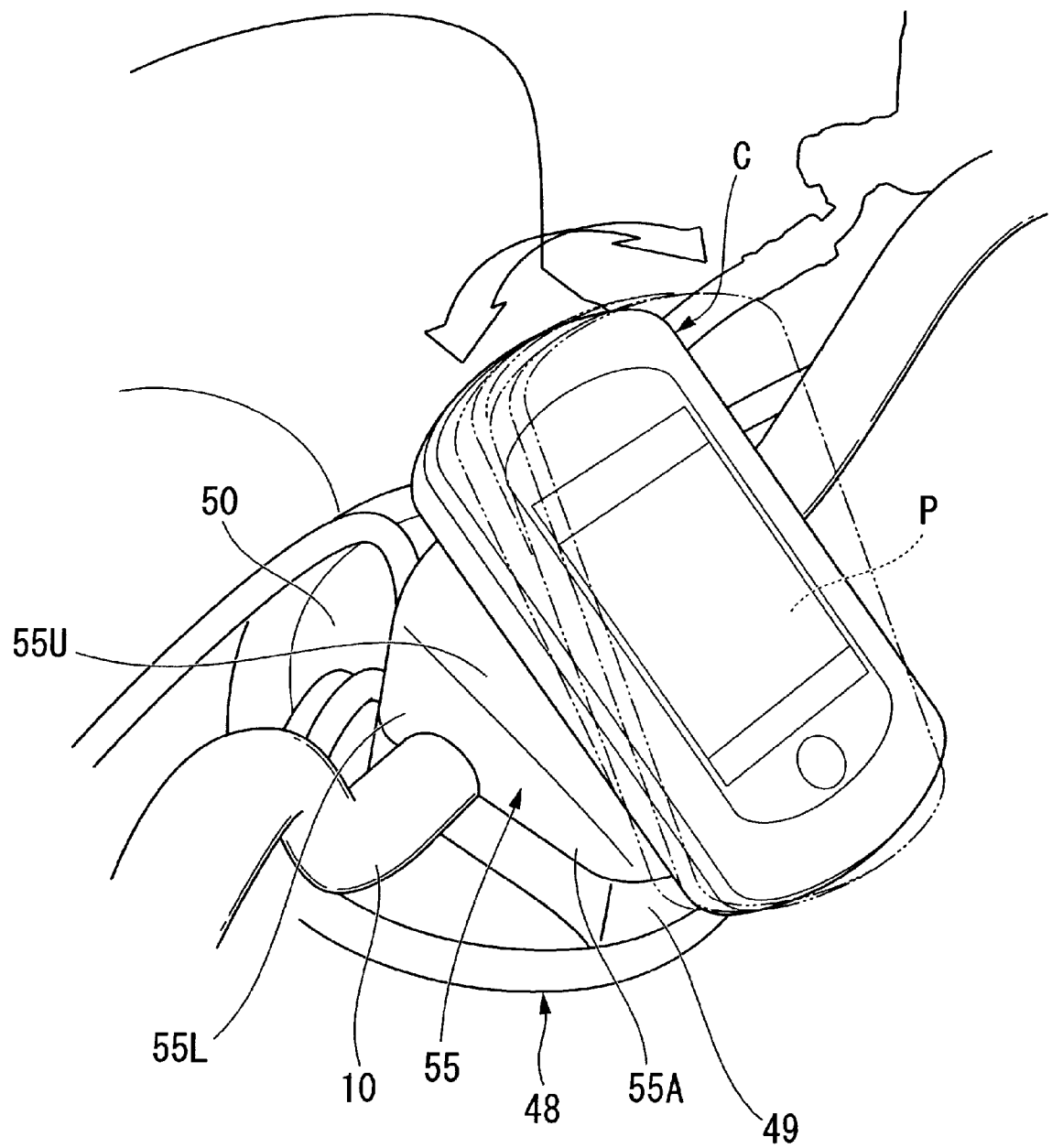
FIG. 6 is a perspective view of a state where a mobile information terminal is attached to the mobile terminal holder.

Referring to FIGS. 2 and 6, a mobile terminal holder 55 is provided above the upper holders 42L, 42R in the embodiment. As shown in FIG. 6, a mobile information terminal case C housing a mobile information terminal P can be attached to the mobile terminal holder 55. Moreover, a wireless charging structure is formed between the mobile terminal holder 55 and the mobile information terminal case C. As shown in FIGS. 4 and 5, a transmitting coil 56 in the wireless charging structure is built into the mobile terminal holder 55 and the mobile information terminal P can be charged in the state where the mobile information terminal case C housing the mobile information terminal P is attached to the mobile terminal holder 55. Moreover, a receiving coil is provided in the mobile information terminal case C as will be described later in detail.

The mobile terminal holder 55 is described below in detail. Referring to FIGS. 3 to 5 and FIG. 8A, the mobile terminal holder 55 includes: a pedestal part 55A which covers the upper holders 42L, 42R from above and from the front, rear, left, and right sides and whose lower end is continuous with an upper end of the peripheral wall portion 49; a supporting body 60 which has an annular connection portion 60A and a substantially-columnar column portion 60B, the annular connection portion 60A turnably supported by a first shaft portion 59 provided to extend in the vehicle width direction in a recessed portion 58 (see FIG. 8A) formed in an upper portion of the pedestal part 55A, the column portion 60B connected to the connection portion 60A and extending a direction orthogonal to the first shaft portion 59; a circular-plate-shaped base portion 62 which is turnably supported by a distal end of the supporting body 60 (column portion 60B) and which bulges outward in a radial direction of the supporting body 60, the plate thickness of the base portion 62 set to be relatively thick; and paired first locking portion 63 and second locking portion 64 which stands on the base portion 62 and which are used to lock the mobile information terminal case C. Referring to FIG. 5, the mobile terminal holder 55 is located on the extending line of the steering axis L1, to be more specific, is disposed in such a way that the substantial center of the base portion 62 is located on the steering axis L1. The mobile terminal holder 55 is configured hold the mobile information terminal case C on the steering axis L1 with the first locking portion 63 and the second locking portion 64.

In the embodiment, the pedestal part 55A is formed in a substantially rectangular shape in the top view and has: an upper wall portion 55U covering the upper holders 42L, 42R from above; a front wall portion 55F extending downward from a front edge of the upper wall portion 55U and covering the upper holders 42L, 42R from the front side; a left wall portion 55L extending downward from a left edge of the upper wall portion 55U and covering the upper holders 42L, 42R from the left side; a right wall portion 55R extending downward from a right edge of the upper wall portion 55U and covering the upper holders 42L, 42R from the right side. The upper wall portion 55U extends downward toward the rear and the upper holders 42L, 42R are thus covered from the rear side with a rear portion of the upper wall portion 55U.

Figure 8A:
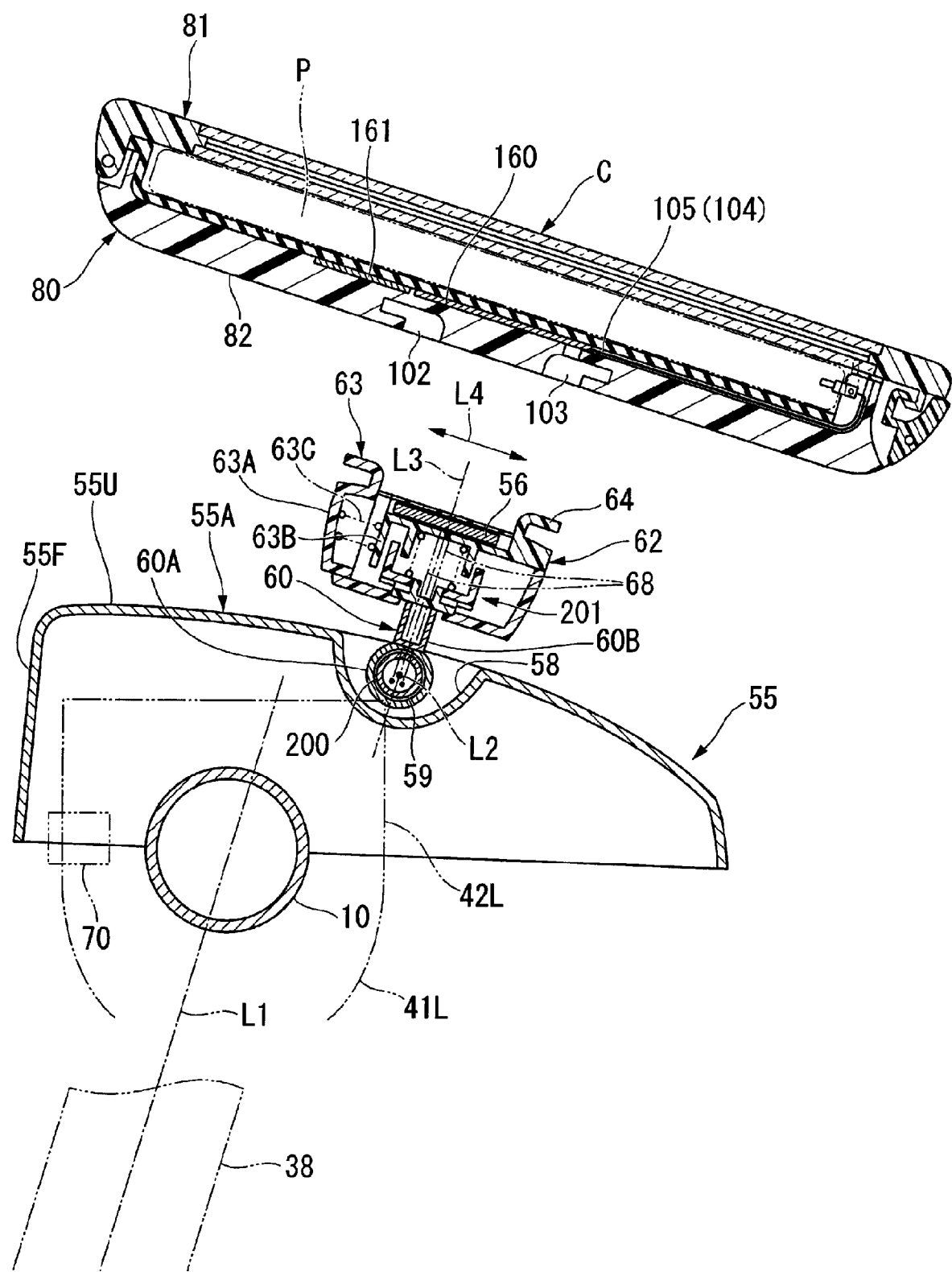
FIG. 8A is a cross-sectional view taken along the X-X line of FIG. 5.

The supporting body 60 is provided on the pedestal part 55A and is turnably supported by the first shaft portion 59 which is disposed parallel to an extending direction of the handle pipe 10 and which is disposed behind the handle pipe 10. By this configuration, the base portion 62 can swing in the up-down direction about the first shaft portion 59. Moreover, the base portion 62 is turnably supported by the supporting body 60 and can thereby turn about an axis of the supporting body 60. In FIG. 8A, reference numeral L2 denotes an axis of the first shaft portion 59 and reference numeral L3 denotes an axis of supporting body 60. Furthermore, the supporting body 60 is supported by the first shaft portion 59 in such a way that the supporting body 60 can turn and also maintain its posture in a certain state and the base portion 62 is supported by the supporting body 60 in such a way that the base portion 62 can turn and also maintain its posture in a certain state In the embodiment, a first angle adjusting portion 200 provided on an outer periphery of the first shaft portion 59 and a second angle adjusting portion 201 provided in the base portion 62 are provided as a mechanism for maintaining the postures as described above.

Figure 8B:
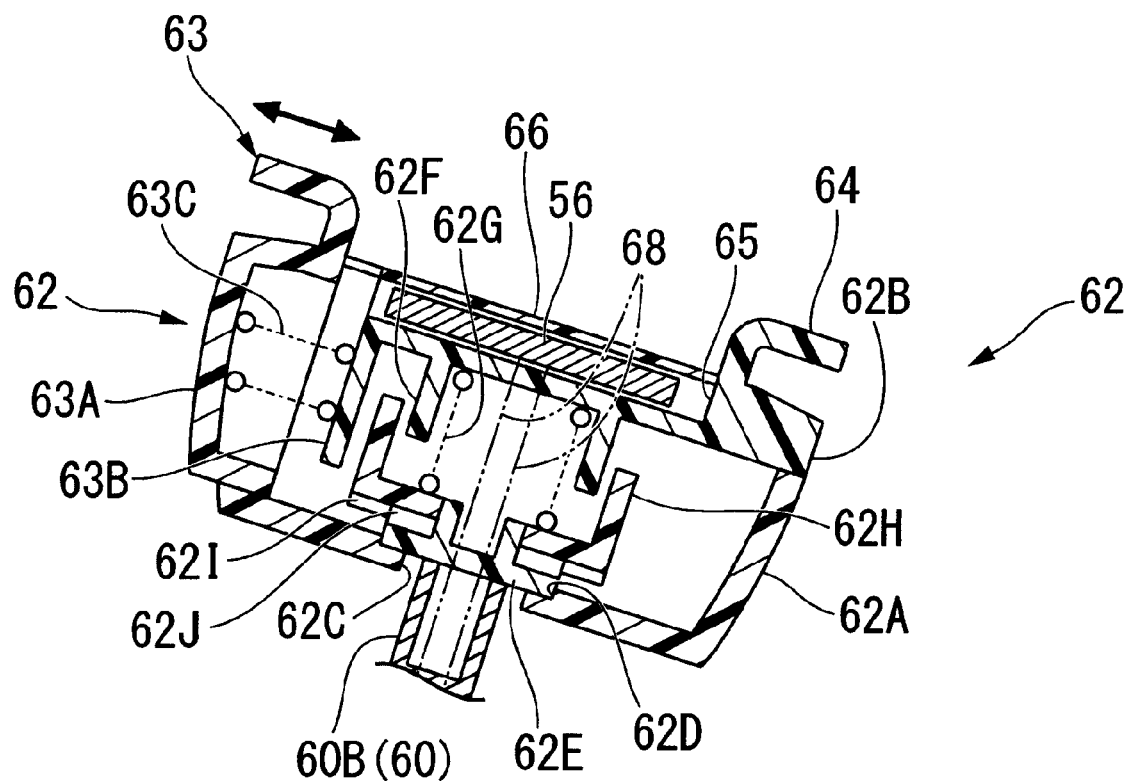
FIG. 8B is an enlarged view of a main portion in FIG. 8A.

The base portion 62 is described in detail by referring to FIG. 8B. The base portion 62 includes a base portion main body 62A formed in a bottomed flat tube shape and a lid portion 62B closing a mouth portion of the base portion main body 62A. A circular opening 62C is formed in a bottom surface of the base portion main body 62A. In a peripheral portion of the opening 62C located on the interior side of the base portion main body 62A, there is formed a guide circular groove 62D extending over the entire peripheral portion. A circular plate 62E is turnably fitted to the guide circular groove 62D and the distal end of the supporting body 60 extending through the opening 62C is unrotatably fixed to the circular plate 62E. The base portion 62A is thereby configured to be unrotatable to the circular plate 62E.

A tubular guide tube portion 62F extending toward the circular plate 62E is formed on an inner surface of the lid portion 62B. A coil spring 62G is disposed inside the guide tube portion 62F. A bottomed-tube-shaped engagement tube portion 62H is fitted to the outer side of the guide tube portion 62F while being restricted in movement in a circumferential direction relative to the guide tube portion 62F. The engagement tube portion 62H is biased toward the circular plate 62E by the coil spring 62G and a bottom portion of the engagement tube portion 62H comes in contact with the circular plate 62E.

In a bottom portion of the engagement tube portion 62H, there are formed multiple grooves 62I . . . extending radially from the center of the bottom portion. Meanwhile, multiple protruding portions 62J . . . protruding toward the lid portion 62B of the circular plate 62E are formed on a surface of the circular plate 62E facing the lid portion 62B, at intervals in a circumferential direction of the circular plate 62E. The protruding portions 62J . . . are fitted to the grooves 62I . . . to be capable of riding over the grooves 62I . . . in a turning direction when the base portion 62 is turned. Due to this fitting, the posture of the base portion 62 relative to the supporting body 60 is maintained. Meanwhile, when the base portion 62 is turned, the protruding portions 62J . . . ride over the grooves 62I . . . and the turning of the base portion 62 is allowed. Thereafter, the protruding portions 62J . . . are fitted again into the grooves 62I . . . at a position different from that before the turning and the posture of the base portion 62 relative to the supporting body 60 is thereby maintained. Turning adjustment of the base portion 62 is thus made possible.

In the embodiment, the angle adjusting portion 201 is formed by forming the locking structure between the supporting body 60 and the base portion 62 and detailed description is given only of the angle adjusting portion 201. The angle adjusting portion 200 may be similar to the angle adjusting portion 201. Moreover, the angle adjusting portions 200, 201 may be angle adjusting portions of any type. For example, one using a latchet mechanism or one in which elastic material is disposed between a shaft portion and a shaft receiving portion supporting the shaft portion may be employed.

Next, returning to FIG. 8A, the first locking portion 63 and the second locking portion 64 are each formed to have an L-shaped cross section and stand apart from each other on the base portion 62 with one end portions thereof connected to an upper surface of the base portion 62 and with other end portions (hereafter, referred to as distal ends) thereof facing away from each other. Moreover, the first locking portion 63 and the second locking portion 64 are disposed at positions opposite to each other in a radial direction of the axis L3 with the axis L3 therebetween. Here, reference numeral L4 in FIG. 8A denotes an arrangement direction in which the first locking portion 63 and the second locking portion 64 are arranged in the radial direction of the axis L3.

As shown in FIG. 8B, in the embodiment, the first locking portion 63 is formed integrally with a slide portion 63A provided in the base portion main body 62A. The slide portion 63A is movable inward and outward in a radial direction of the base portion main body 62A as shown by the two-direction arrow in the drawing. Meanwhile, the second locking portion 64 is provided integrally with the lid portion 62B.

The slide portion 63A is fitted to a partially-cutaway portion in a peripheral wall portion of the base portion main body 62A. A coil spring 63C which has one end in contact with a holding plate portion 63B extending from the inner surface of the lid portion 62B toward the circular plate 62E biases the slide portion 63A outward in the radial direction of the base portion main body 62A at the other end. In this biased state, the slide portion 63A can be pressed inward in the radial direction of the base portion main body 62A against the biasing force of the coil spring 63C.

In the embodiment, a recessed portion 65 forming a mounting portion is formed between the first locking portion 63 and the second locking portion 64 in the outer surface of the lid portion 62B. The transmitting coil 56 is provided in the recessed portion 65 in such a way as to be mounted on a bottom surface of the recessed portion 65. A coil cover 66 is detachably attached to the recessed portion 65 and the transmitting coil 56 is thus covered with the coil cover 66. In the transmitting coil 56, magnetic flux is generated by a flow of an electric current. In the embodiment, the transmitting coil 56 is formed a flat-plate-shaped spiral coil and is provided in such a way that the center axis thereof is directed toward the mobile information terminal case C (to be more specific, the back surface thereof) when the mobile information terminal case C is attached to the mobile terminal holder 55. More specifically, the transmitting coil 56 is provided in such a way that a magnetic flux line generated along the center axis of the transmitting coil 56 in the magnetic flux generated by a flow of electric current passes through the mobile information terminal case C when the mobile information terminal case C is attached to the mobile terminal holder 55. Moreover, reference numeral 68 in the drawing denotes a connection line continuous with the transmitting coil 56. The connection line 68 is shown by two-dot chain lines for the convenience of description. Furthermore, the coil spring 63C is provided below the transmitting coil 56 in the base portion main body 62A and is located farther away from a receiving coil to be described later than the transmitting coil 56 is.

The holding plate portion 63B is formed integrally with an end portion of the bottom surface of the recessed portion 65 in the lid portion 62B and extends downward. In the embodiment, as described above, a portion to be a mounting portion for the transmitting coil 56 and a portion to which the coil spring 63C comes in contact are formed as the same member and the number of parts is thereby reduced.

The first locking portion 63 and the second locking portion 64 are inserted respectively into paired locking holes formed in the mobile information terminal case C by appropriately sliding the first locking portion 63. The mobile information terminal case C is positioned by bringing the distal end of one of the first locking portion 63 and the second locking portion 64 in contact with the mobile information terminal case C in one of the locking holes from one direction and by bringing the front end of the other one of the first locking portion 63 and the second locking portion 64 in contact with the mobile information terminal case C in the other one of the locking holes from another direction which is opposite to the one direction and the mobile information terminal case C is thereby attached. Specific description of this attachment is given later.

Next, the connection line 68 is described. The connection line 68 supplies electric power from the battery B to the transmitting coil 56, so that magnetic flux can be generated in the transmitting coil 56. The transmitting coil 56 is configured such that alternating current is supplied thereto. Referring to in FIG. 8A, the connection line 68 connects the transmitting coil 56 and a transmission control unit 70 to each other, the transmission control unit 70 configured to step down voltage from the battery B, convert direct current to alternating current, and perform like operations. The transmission control unit 70 converts direct current to alternating current after stepping down voltage from the battery B and then causes the alternating current to flow to the transmitting coil 56 through the connection line 68.

Referring to FIGS. 2, 5, 8A, and 10, in the embodiment, the transmission control unit 70 is disposed on the upper surface of the rear half 47 of the handle cover 48 to be located between a group of the left lower holder 41L and the left upper holder 42L and a group of the right lower holder 41R and the right upper holder 42R in a view in a direction of the steering axis L1 and to be partially located behind a straight line L6 (see FIG. 5) connecting a front end of the group of the left lower holder 41L and the left upper holder 42L and a front end of the group of the right lower holder 41R and the right upper holder 42R. More specifically, the transmission control unit 70 is disposed in front of the steering axis L1 in the vehicle side view. Moreover, as shown in FIG. 9, the transmission control unit 70 includes paired flange portions 71, 71 coming in contact with the upper surface of the rear half 47 and is fixed by inserting bolts 72 into the flange portions 71, 71.

Figure 9:
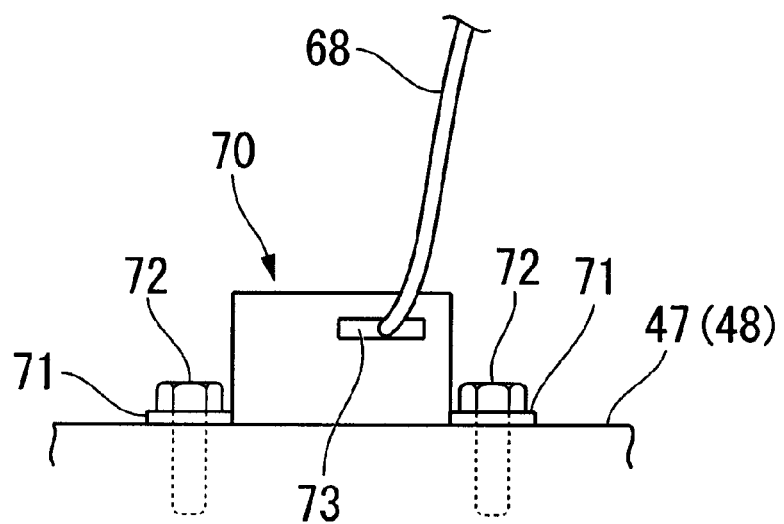
FIG. 9 is an enlarged view of a transmission control unit disposed in a handle cover included in the motorcycle.

As shown in FIG. 9, the connection line 68 is attachably and detachably connected to the transmission control unit 70 via a connector 73, extends upward from the transmission control unit 70, and is disposed in the pedestal part 55A. Then, referring to FIG. 8A, the connection line 68 runs from the inside of the pedestal part 55A to the inside of the first shaft portion 59, lead out from an appropriate portion of the first shaft portion 59, and is connected to the transmitting coil 56.

Figure 10:
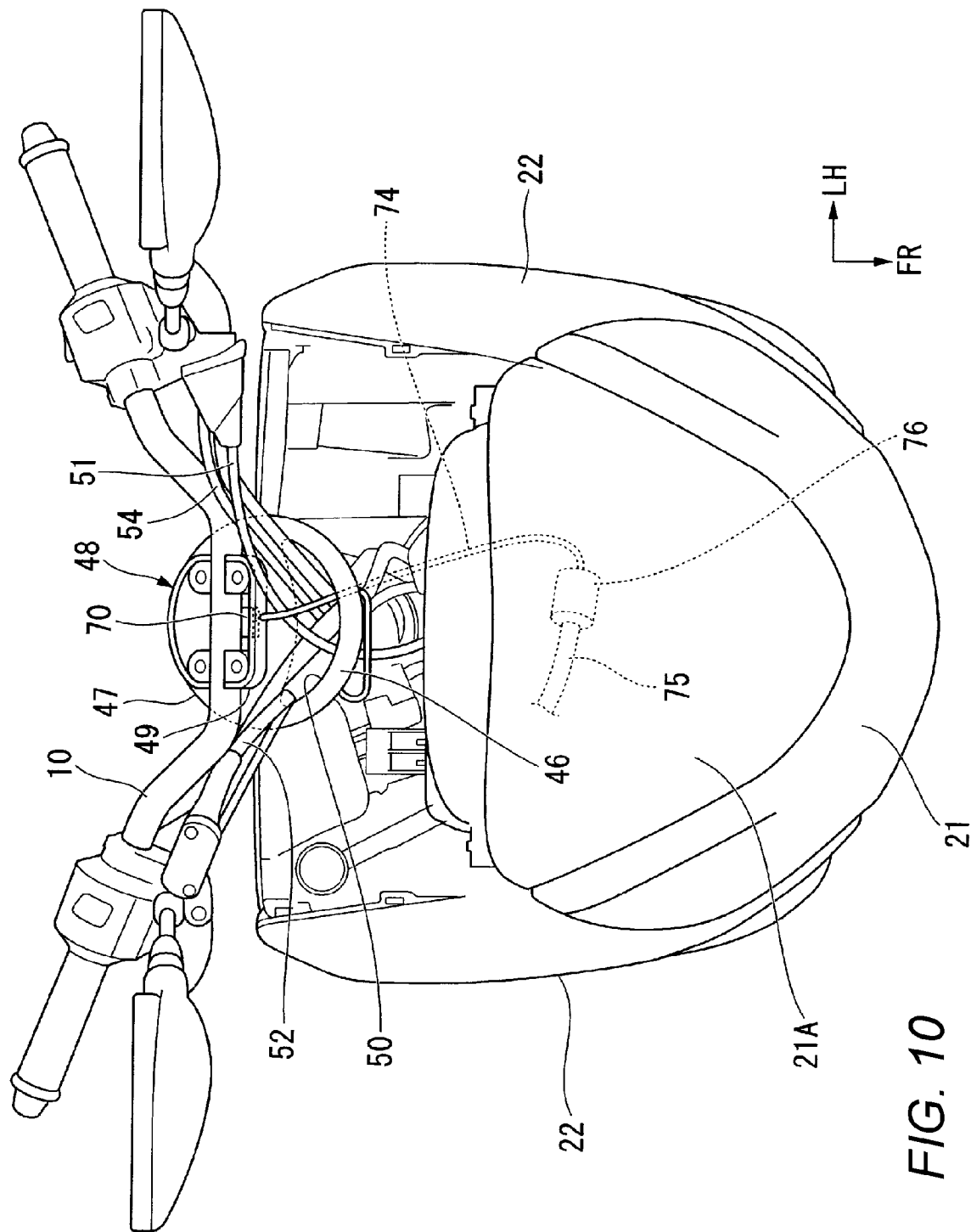
FIG. 10 is a bird's eye view looking down at the portion around the handle pipe of the motorcycle from above the vehicle in an oblique rearward and downward direction.
Figure 11:
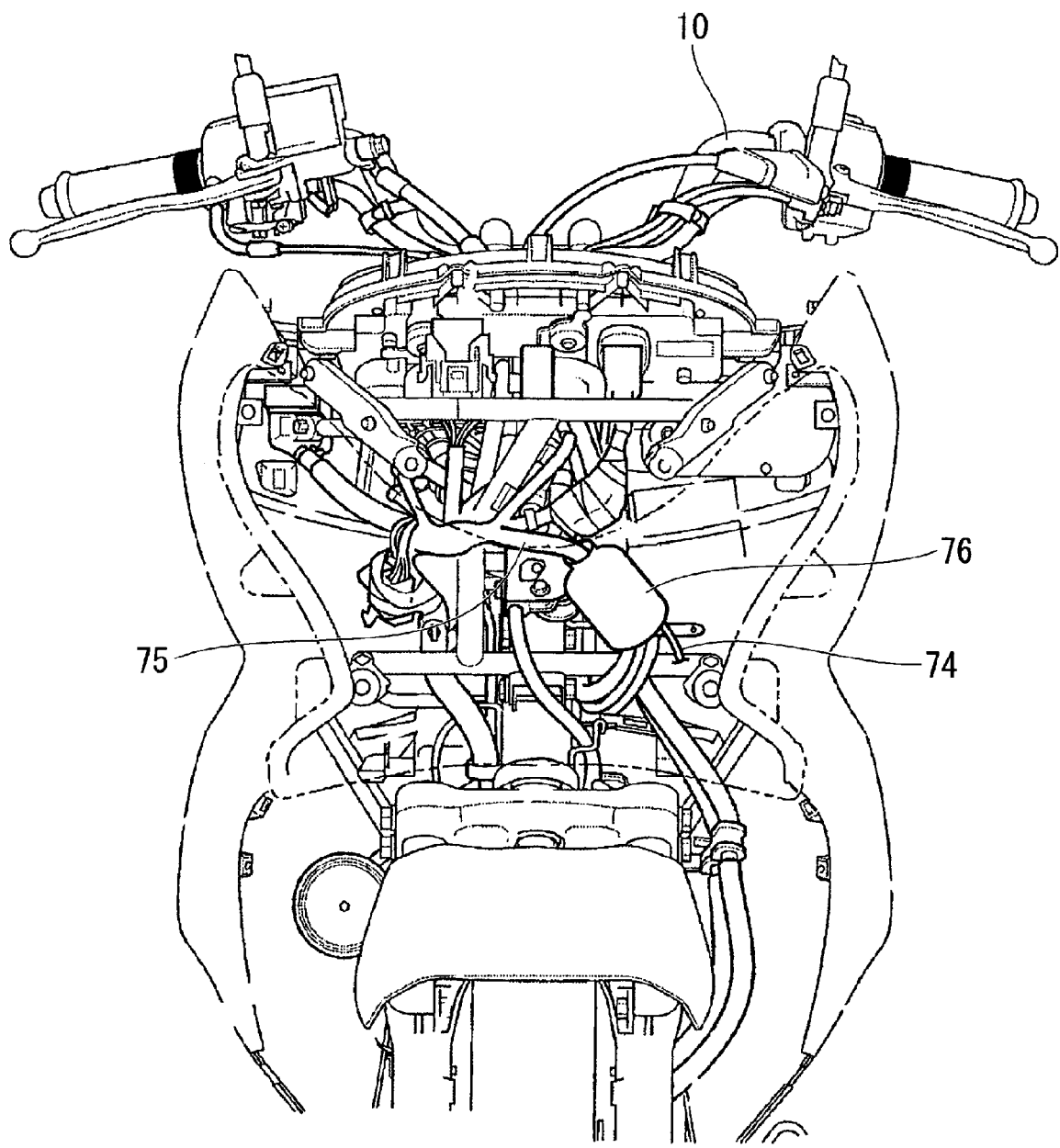
FIG. 11 is a view showing an interior of a vehicle front portion of the motorcycle.
Figure 12:
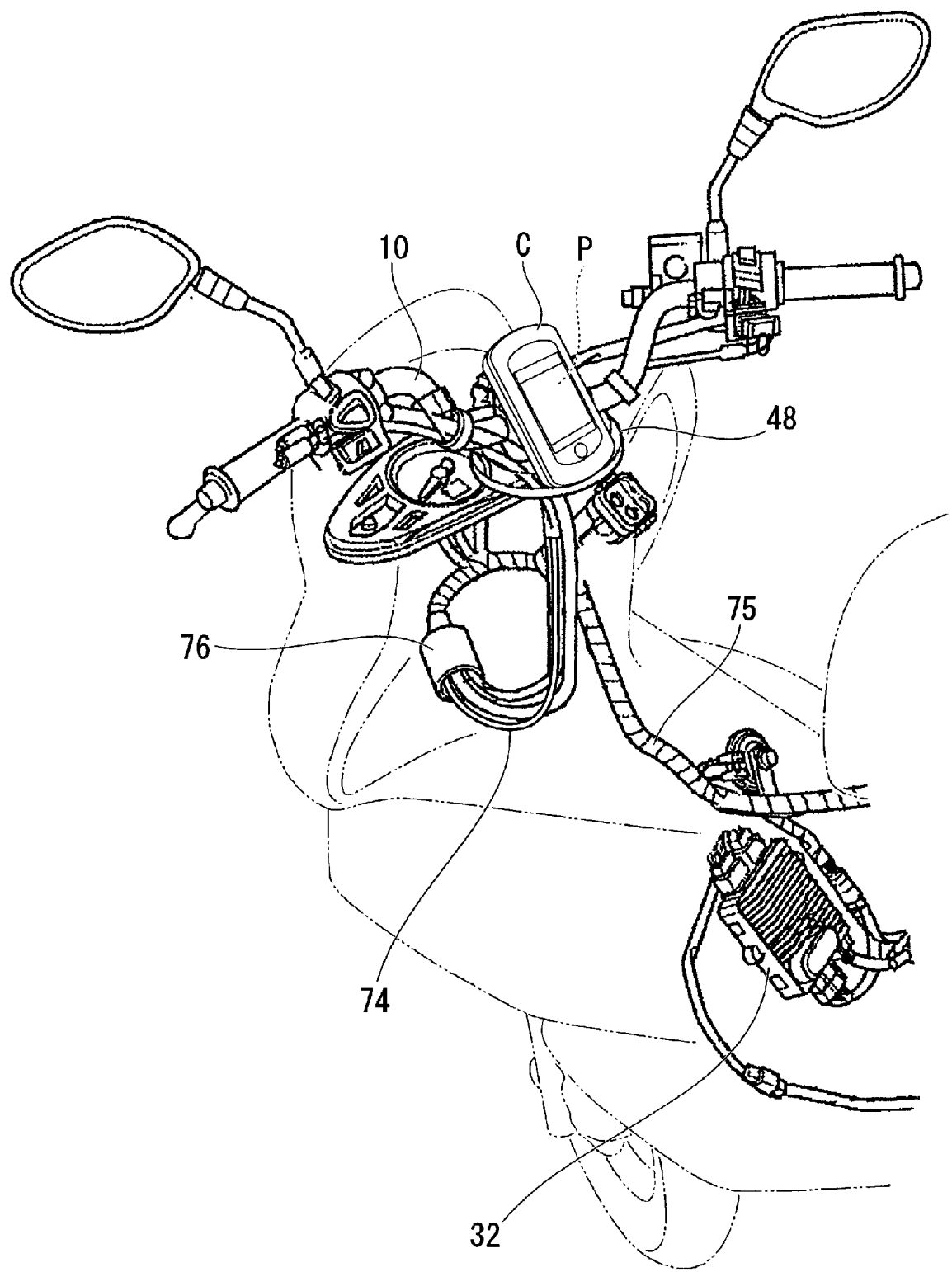
FIG. 12 shows a main harness of the motorcycle.

Meanwhile, referring to FIGS. 10 to 12, the transmission control unit 70 and the battery B are connected each other through a relay cord 74 and a main harness 75. As shown in FIG. 12, the main harness 75 is formed by bundling multiple wires such as wires for supplying power from the battery B to accessories and sensors mounted on the vehicle and wires for outputting information detected by the sensors to the ECU 32. The main harness 75 extends in the vehicle front-rear direction and, as shown in FIGS. 10 and 11, is provided in the vehicle in such a way that a coupler 76 in which multiple connectors of the respective wires are bundled is disposed in front of the head pipe 12.

As shown in FIG. 10, in the embodiment, the relay cord 74 runs from the transmission control unit 70 through the routing hole 50 of the handle cover 48 and extends downward. Then, after running on the front side of the steering shaft 9 and the head pipe 12, the relay cord 74 extends frontward and is connected to a connector which is included in the coupler 76 and which not illustrated. A connector to which the handle switch cable 54 is connected and the like are also included in the coupler 76.

Figure 13:
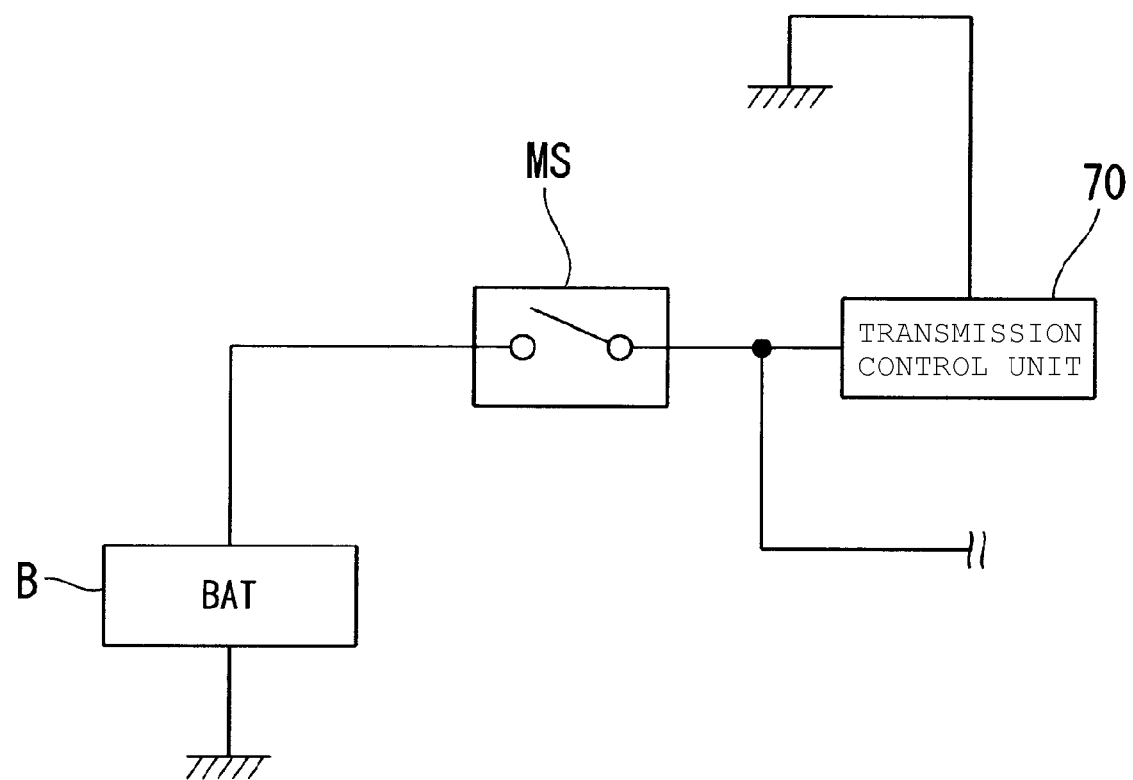
FIG. 13 is an electric circuit diagram of a battery and a voltage converter in the motorcycle.

FIG. 13 shows a diagram of an electric circuit connecting the battery B and the transmission control unit 70. As shown in FIG. 13, the transmission control unit 70 is arranged downstream of a main switch MS and conduction between the transmission control unit 70 and the battery B is achieved when the main switch MS is turned on by a key operation of the driver. Unintended charging performed while the vehicle is parked can be thus prevented.

Figure 14:
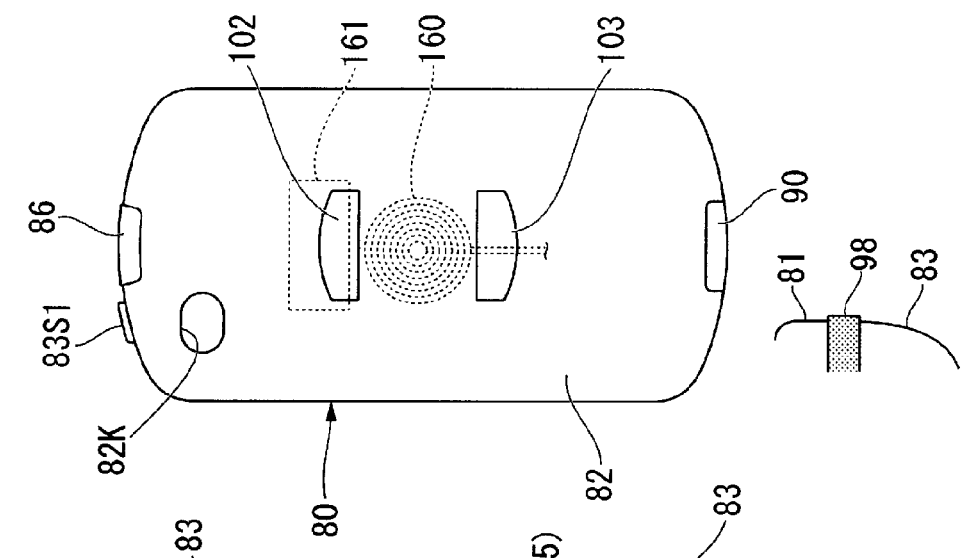
FIG. 14A is a front view showing a mobile information terminal case which is attached to the mobile terminal holder and which houses the mobile information terminal.
FIG. 14B is a left-side view showing the mobile information terminal case which is attached to the mobile terminal holder and which houses the mobile information terminal.
FIG. 14C is a plan view showing the mobile information terminal case which is attached to the mobile terminal holder and which houses the mobile information terminal.
FIG. 14D is a bottom view showing the mobile information terminal case which is attached to the mobile terminal holder and which houses the mobile information terminal.
FIG. 14E is a back view showing the mobile information terminal case which is attached to the mobile terminal holder and which houses the mobile information terminal.
FIG. 14F is an enlarged view of a main portion of FIG. 14D.
Figure 15:
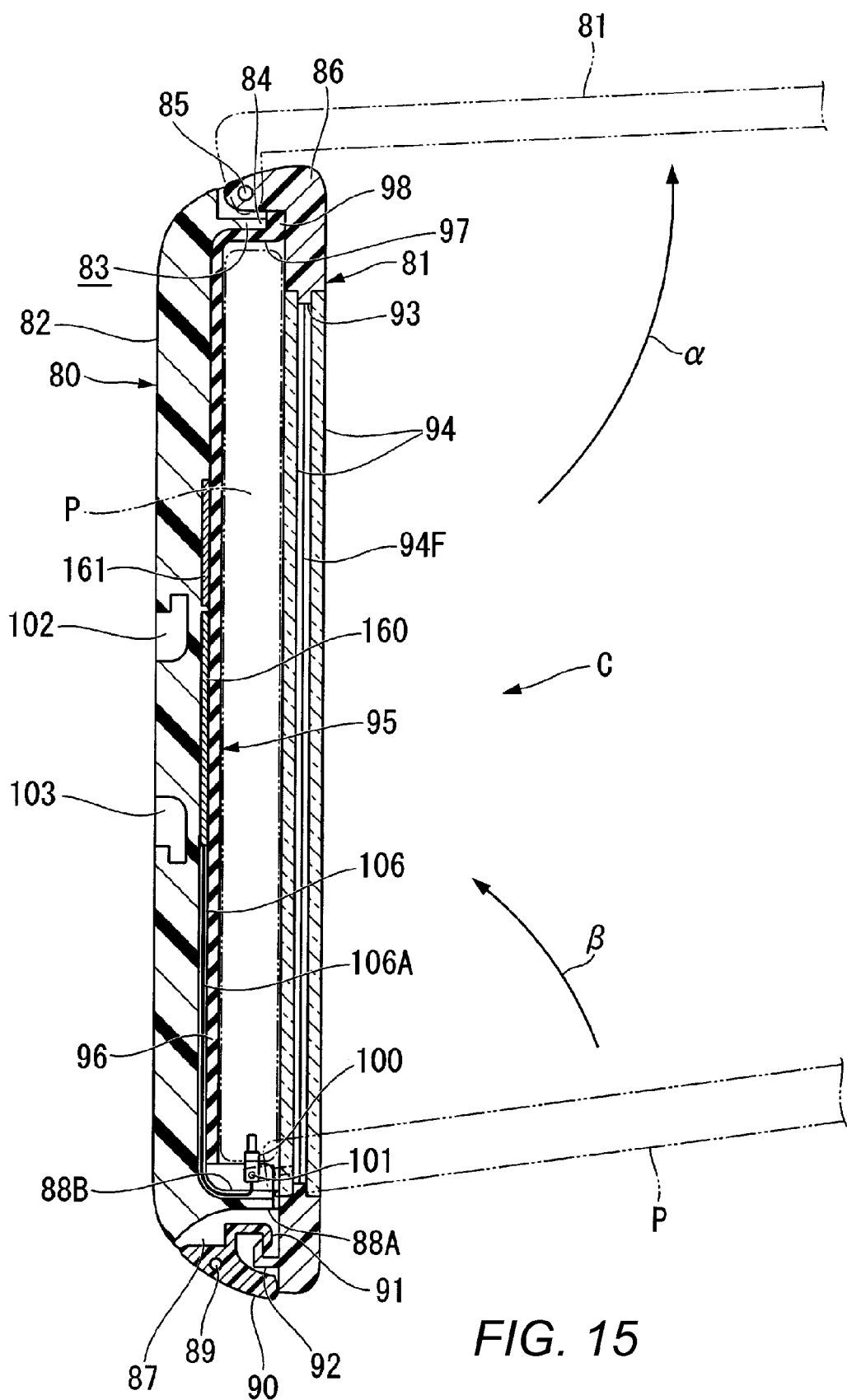
FIG. 15 is a cross-sectional view taken along the Y-Y line of FIG. 14A.
Figure 16:
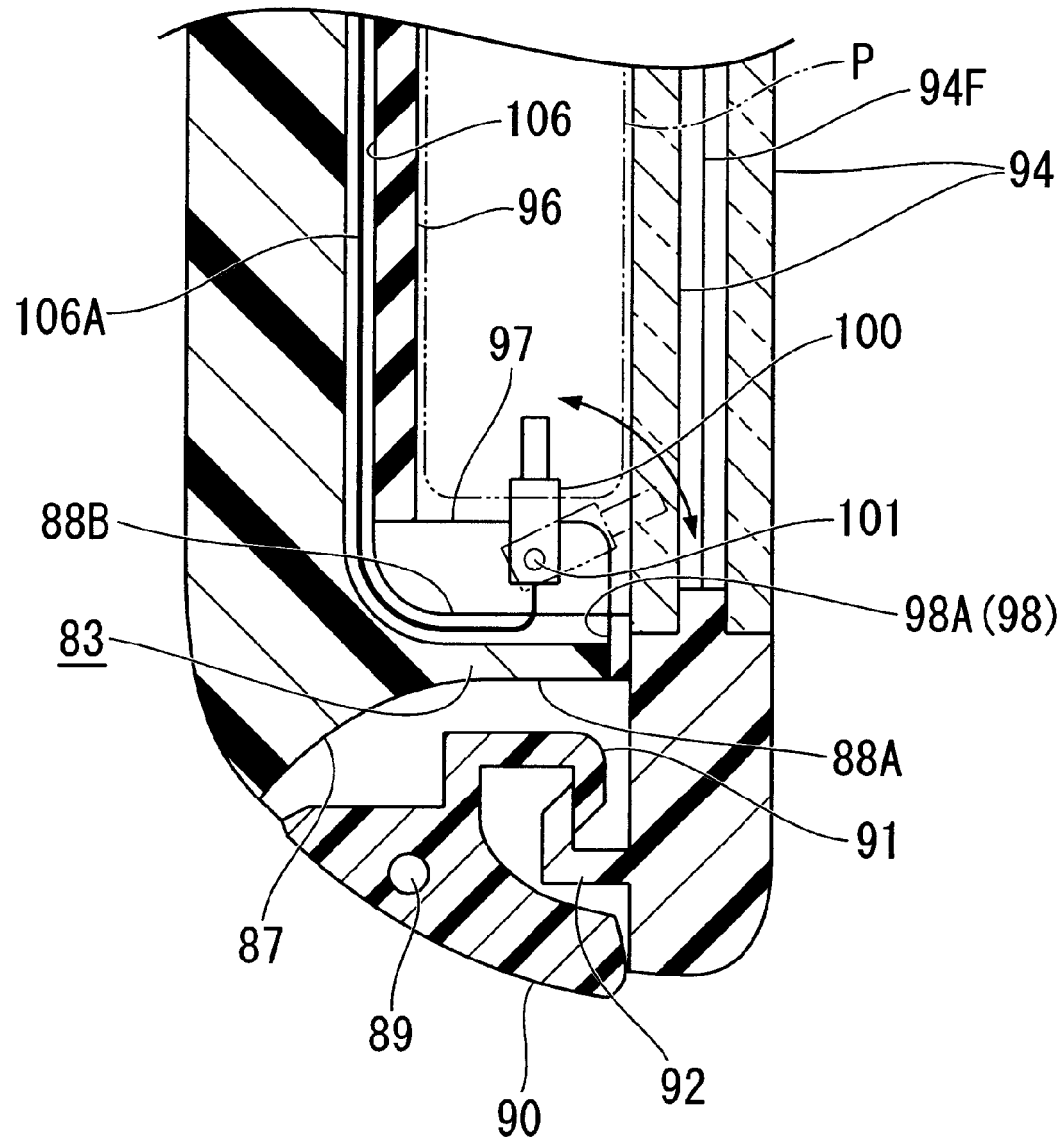
FIG. 16 is an enlarged view of a main portion of FIG. 15.

Next, the mobile information terminal case C is described. FIG. 14A is a front view of the mobile information terminal case C, FIG. 14B is a left-side view of the mobile information terminal case C, FIG. 14C is a plan view of the mobile information terminal case C, FIG. 14D is a bottom view of the mobile information terminal case C, FIG. 14E is a back view of the mobile information terminal case C, and FIG. 14F is an enlarged view of a main portion of FIG. 14D. FIG. 15 is a cross-sectional view taken along the Y-Y line in FIG. 14A and FIG. 16 is an enlarged view of a main portion of FIG. 15. The mobile information terminal case C is described below based on the directions in FIGS. 14A to 14F and the side shown in the plan view is defined as the upper side while the side shown in the bottom view is defined as the lower side.

The mobile information terminal case C is a rectangular case housing the mobile information terminal P and covers the back surface and the entire side surface of the mobile information terminal P. The mobile information terminal case C includes a case main body 80 having an opening through which a front surface of the mobile information terminal P is exposed and a lid member 81 covering the opening of the case main body 80 and configured to be openable and closable. The case main body 80 includes a back surface wall portion 82 covering the back surface covering the back surface of the mobile information terminal P and a side wall portion 83 standing from an outer peripheral edge of the back surface wall portion 82 and covering the entire side surface of the mobile information terminal P. The mobile information terminal P is housed in a space surrounded by the back surface wall portion 82 and the side wall portion 83 and the front surface in which a display portion (liquid crystal screen) of the mobile information terminal P is provided is covered with the lid member 81. In the following description, surfaces of the case main body 80 and the lid member 81 which are exposed to the outside in the state where the case main body 80 is closed by the lid member 81 are referred to as outer surfaces and surfaces thereof which are not exposed in the above state are referred to as inner surfaces in some cases.

The outer surface of the side wall portion 83 is formed in a shape gradually bulging outward from the back surface wall portion 82. As shown in FIG. 15, a notch is formed in a center portion of an upper side wall portion 84 in an extending direction thereof (right-left direction), the upper side wall portion 84 located on the upper side of the side wall portion 83. A hinge shaft 85 extending in the extending direction of the upper side wall portion 84 is provided in the notch. The lid member 81 includes a supported portion 86 turnably supported by the hinge shaft 85, on the one end side in a longitudinal direction of the lid member 81. The supported portion 86 is supported by the hinge shaft 85 and the case main body 80 is thereby configured to be openable and closable.

Meanwhile, a lower side wall portion 87 located on the lower side of the side wall portion 83 is formed to be thicker than the upper side wall portion 84 and an outer recessed portion 88A recessed inward from an outer surface of the lower side wall portion 87 is formed in a center portion of the lower side wall portion 87 in the extending direction (right-left direction) thereof. In the outer recessed portion 88A, a shaft 89 extending in the extending direction of the lower side wall portion 87 is provided and an operation piece 90 is housed while being turnably supported by the shaft 89.

The operation piece 90 is formed in an arc shape in a cross-sectional view and has a certain width in a right-left direction of the case main body 80. An outer surface of an arc-shaped surface of the operation piece 90 is provided to face the outside of the case main body 80 and to be continuous with the outer surface of the case main body 80 in such a way that there is uniformity. The operation piece 90 is supported by the shaft 89 at an end portion on the back surface wall portion 82 side out of end portions of the arc shape. The end portion of the operation piece 90 on the back surface wall portion 82 side is brought into contact with an inner surface of the outer recessed portion 88A when an end portion of the operation piece 90 on the lid member 81 side is turned to the outside of the case main body 80 about the shaft 89. This restricts the turning of the operation piece 90 to the outside of the case main body 80. Moreover, the operation piece 90 is configured such that the end portion thereof on the lid member 81 side can be operated to turn toward the inside of the case main body 80 about the shaft 89 from the state where the end portion of the operation piece 90 on the back surface wall portion 82 side is in contact with or close to the inner surface of the outer recessed portion 88A.

Referring to FIG. 16, an L-shaped locking piece 91 is formed integrally on the inner surface of the arch-shaped surface of the operation piece 90, the locking piece 91 extending toward the lid member 81 along the side wall portion 83 and having a distal end facing the outside of the lower side wall portion 87. Meanwhile, the lid member 81 has an L-shaped locked piece 92 on the inner surface in a portion on the other end side in the longitudinal direction thereof, the locked piece 92 having a distal end configured to be locked to the distal end of the locking piece 91. Locking the distal end of the locked piece 92 to the distal end of the locking piece 91 in a standing direction of the side wall portion 83 causes the lid member 81 to be maintained in a closed state. Meanwhile, performing turn operation of the operation piece 90 to release the locking state allows the lid member 81 to open.

An inner recessed portion 88B recessed outward from an inner surface of the lower side wall portion 87 is formed in a center portion of the lower side wall portion 87 of the side wall portion 83 in an extending direction (right-left direction) thereof. A charging connector 100 is provided in the inner recessed portion 88B, the charging connector 100 configured to be connected to a charging port (not illustrated) provided in an end portion of the mobile information terminal P in a longitudinal direction thereof. To be more specific, as shown in FIG. 16, a shaft 101 is disposed in the inner recessed portion 88B and the charging connector 100 is supported by the shaft 101 to be turnable within a range from an open direction of the case main body 80 to an inward direction of the case main body 80 as shown by the turning arrow in the drawings. A distal end of the charging connector 100 protrudes from the lower side wall portion 87. The charging connector 100 is provided with a terminal not shown and configured to be connected to a positive charging contact point and a negative charging contact point which are provided in the charging port of the mobile information terminal P.

Furthermore, as shown in FIG. 14A, a rectangular window portion 93 making the display portion provided on the front surface side of the mobile information terminal P viewable is formed in lid member 81. As shown in FIG. 15, paired transparent plate materials 94, 94 are arranged parallel to each other in the window portion 93 and the window portion 93 is thereby closed in a double seal structure. This prevents fogging of the transparent plate materials 94, 94. In the embodiment, the transparent plate materials 94, 94 are fixedly attached to a peripheral edge of the window portion 93 by adhesive. Moreover, a transparent thermal insulation film 94F is provided between the transparent plate materials 94, 94 and heat transmission to the inside of the case main body 80 from the transparent plate materials 94, 94 is thereby suppressed. In the embodiment, the transparent thermal insulation film 94F is provided between the transparent plate materials 94, 94. However, the transparent thermal insulation film 94F may be adhered to an outer surface of one of the transparent plate materials 94, 94 located on the outer side.

Moreover, as shown in FIG. 15, a spacer 95 made of elastic material is attachably and detachably provided inside the case main body 80, the spacer 95 configured to come in contact with the back surface and the side surface of the mobile information terminal P and configured such that the front surface of the mobile information terminal P is exposed. In the embodiment, the mobile information terminal P is housed in the spacer 95 while being elastically supported. In FIGS. 14B to 14D, the spacer 95 is shown as a dotted area for convenience of description.

The spacer 95 integrally has: a back-surface contacting wall portion 96 which comes in contact with the back surface of the mobile information terminal P; a side-surface contacting portion 97 which stands from a peripheral edge of the back-surface contacting wall portion 96 and which has a front end portion protruding beyond a front end portion of the side wall portion 83 of the case main body 80 and an inner surface coming in contact with the side surface of the mobile information terminal P; and a flange portion 98 protruding from the side-surface contacting portion 97 toward the front end of the side wall portion 83. As shown in FIGS. 14B to 14D, in the state where the lid member 81 is closed, the flange portion 98 is interposed between the front end of the side wall portion 83 and the peripheral edge of the lid member 81 and can be seen from the outside of the mobile information terminal case C. Moreover, as shown in FIG. 14F, in the embodiment, an outer peripheral edge of the flange portion 98 has a shape substantially flush with the outer surface of the side wall portion 83 and the outer surface of the lid member 81 or a shape protruding outward beyond these outer surfaces. Hence, when a user holds the mobile information terminal case C, the user's hand and the flange portion 98 tend to come into contact with each other and slipping is less likely to occur. The flange portion 98 thus has a function of preventing slipping. Moreover, since the spacer 95 forms part of the exterior, a unique exterior can be provided by changing the color of the flange portion 98 to one different from the color of the case main body 80 and the like. Furthermore, since the spacer 95 is attachable and detachable, multiple exterior variations can be provided by preparing multiple color variations.

Moreover, as shown in FIG. 16, an opening portion 98A through which the charging connector 100 is exposed to be turnable is formed in a portion of the side-surface contacting portion 97 of the spacer 95 on the lower side wall portion 87 side.

Furthermore, as shown in FIG. 14E and FIG. 15, a first locking hole 102 and a second locking hole 103 are formed in a substantial center region of the outer surface of the back surface wall portion 82 of the case main body 80, the first locking hole 102 and the second locking hole 103 recessed toward the back surface of the mobile information terminal P and housing the first locking portion 63 and the second locking portion 64 of the mobile terminal holder 55, respectively. Referring to FIG. 8A, the first locking hole 102 and the second locking hole 103 are formed to have L-shaped cross sections matching the first locking portion 63 and the second locking portion 64, respectively. Moreover, as shown in FIGS. 14A to 14F, the back surface wall portion 82 is provided with an opening 82K which enables image capturing by an image capturing part of the mobile information terminal P with the terminal P housed in the mobile information terminal case C. In addition, the side wall portion 83 is provided with an operation portion 83S1 which can be push operated to allow operation of an operation button provided in a side portion of the mobile information terminal P with the mobile information terminal P housed in the mobile information terminal case C. Furthermore, the lid member 81 is provided with an operation portion 83S2 which enables operation of an operation button provided in the front surface of the mobile information terminal P.

Referring to FIG. 15, a receiving coil 160, a reception control unit 161, and a cord 106A are provided in the back surface wall portion 82. The receiving coil 160 is configured such that current flows therethrough along with a passage of the magnetic flux generated by the transmitting coil 56. The reception control unit 161 is electrically connected to the receiving coil 160 and performs operations such as converting alternating current generated in the receiving coil 160 due to the magnetic flux to direct current. The cord 106A connects the reception control unit 161 and the charging connector 100 to each other and supplies the direct current converted by the reception control unit 161 to the charging connector 100. In the embodiment, the receiving coil 160 is formed of a flat-plate-shaped spiral coil and is provided in such a way that a radial direction thereof extends in a surface direction of the back surface wall portion 82.

The receiving coil 160 is provided on the inner side (mobile information terminal P side) of the first locking hole 102 and the second locking hole 103 in a view in a thickness direction of the back surface wall portion 82, at a position overlapping the first locking hole 102 and the second locking hole 103. Moreover, the reception control unit 161 is provided to be offset from the receiving coil 160 toward the upper side wall portion 84 in a surface direction orthogonal to the thickness direction of the back surface wall portion 82. Furthermore, the cord 106A is disposed in a groove portion 106 formed continuously in the inner surfaces of the back surface wall portion 82 and the lower side wall portion 87 of the side wall portion 83.

Referring to FIG. 8A, and FIGS. 14A to 16, when the abovementioned mobile information terminal case C is attached to the mobile terminal holder 55, the first locking portion 63 is slid and inserted into the first locking hole 102 with the second locking portion 64 of the mobile terminal holder 55 inserted into the second locking hole 103 of the mobile information terminal case C.

In the state where the first locking portion 63 and the second locking portion 64 are inserted into the first locking hole 102 and the second locking hole 103, the transmitting coil 56 in the base portion 62 of the mobile terminal holder 55 and the receiving coil 160 in the back surface wall portion 82 of the case main body 80 of the mobile information terminal case C are adjacent to each other with axial directions thereof (penetrating directions of holes at the center of coils) aligned with each other and are in the state where wireless charging can be performed.

Moreover, in the state where the first locking portion 63 and the second locking portion 64 are inserted into the first locking hole 102 and the second locking hole 103, since the first locking portion 63 and the second locking portion 64 have the L-shaped cross sections, the mobile information terminal case C is locked also in a direction in which the mobile information terminal case C moves away from the base portion 62 by the distal ends of the locking portions in the first locking hole 102 and the second locking hole 103 and stability is thereby secured.

Referring to FIG. 15, the mobile information terminal P is housed in the mobile information terminal case C as follows. First, the lid member 81 is opened as shown by α. After the charging port of the mobile information terminal P is connected to the charging connector 100 with the charging connector 100 set in an open direction of the spacer 95, the mobile information terminal P is housed in the spacer 95 in such a way that the charging connector 100 is directed in an inward direction of the side-surface contacting portion 97 of the spacer 95 together with the mobile information terminal P as shown by β with the connection state maintained.

Figure 17:
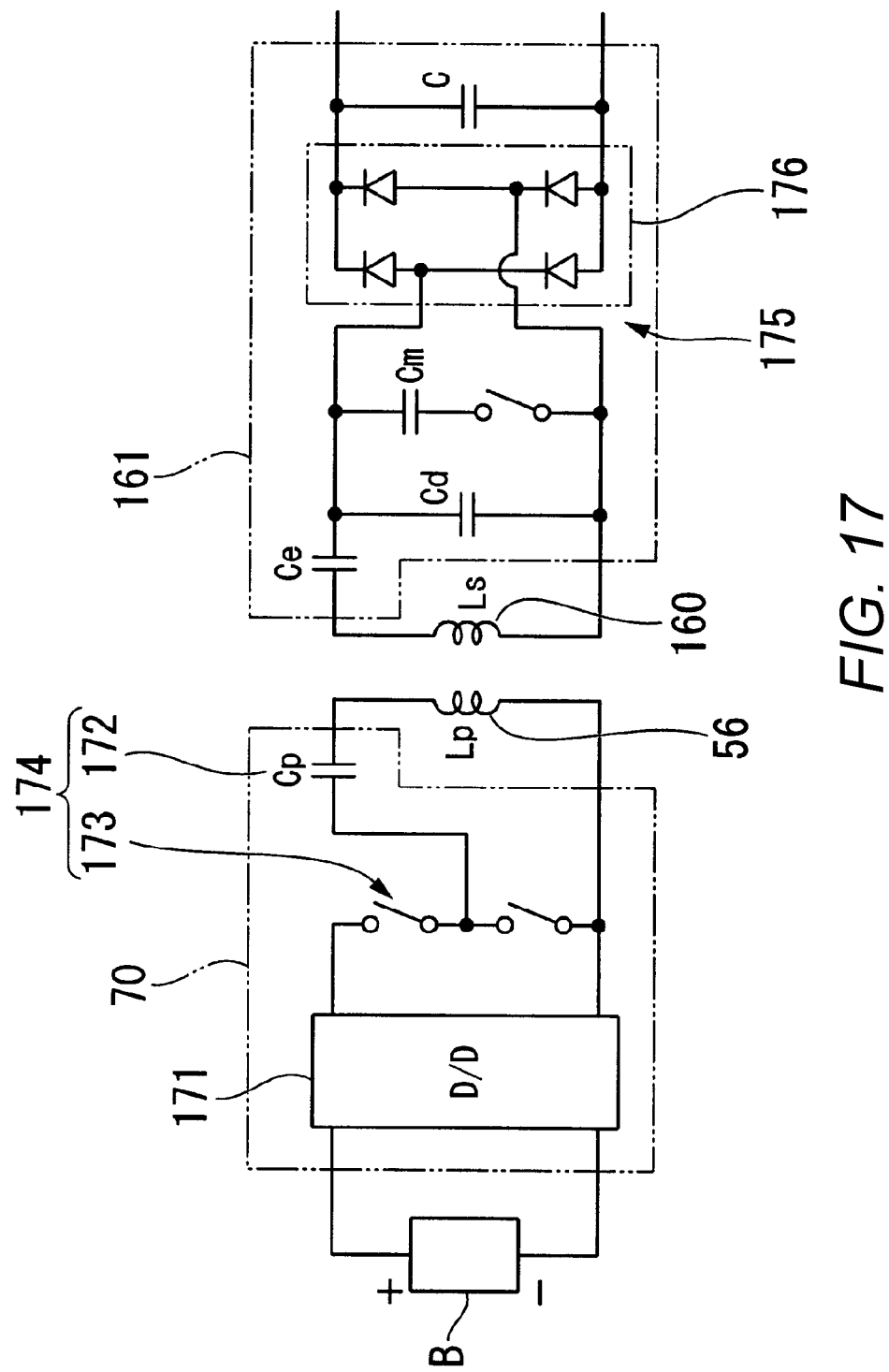
FIG. 17 is an electric circuit diagram of a wireless charging part formed between the mobile terminal holder and the mobile information terminal case.

In the wireless charging between the transmitting coil 56 and the receiving coil 160, the transmission control unit 70 steps down voltage from the battery B, thereafter converts direct current to alternating current, and causes the alternating current to flow through the connection line 68 to the transmitting coil 56. Then, magnetic flux generated in the transmitting coil 56 passes through the receiving coil 160. Alternating current flowing through the receiving coil 160 due to the magnetic flux is converted to direct current in the reception control unit 161 and the direct current is supplied to the charging connector 100 through the cord 106A. FIG. 17 shows an electric circuit diagram of a wireless charging part including the transmitting coil 56, the receiving coil 160, the transmission control unit 70, and the reception control unit 161.

In FIG. 17, a voltage converting part 171 is included in the transmission control unit 70 and steps down voltage from the battery B. A capacitor 172 and a switch circuit 173 are included in the transmission control unit 70 and form an inverter part 174 configured to convert direct current to alternating current. Moreover, a converter part 175 configured to convert alternating current to direct current in the reception control unit 161 is formed of multiple capacitors, an H bridge circuit 176, and the like. Note that the transmission control unit 70 and the reception control unit 161 communicate with each other and also communicate with the mobile information terminal P by performing switching of the switching circuit.

Figure 18:
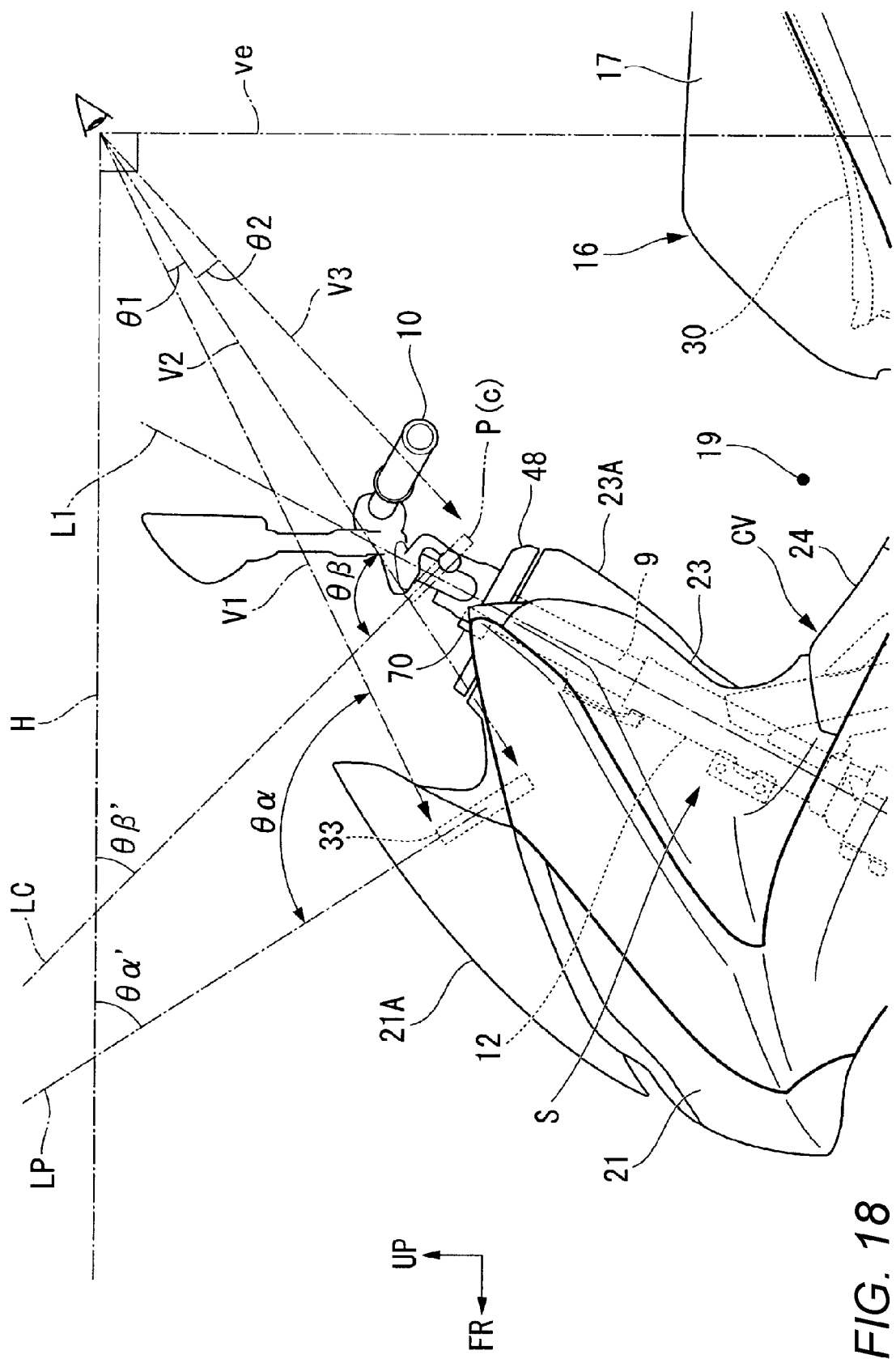
FIG. 18 is an enlarged view of a main portion FIG. 1.

Referring to FIGS. 1 and 18, reference signs V1 to V3 denote some of the sightlines within the field of view of the driver seated on the seat 16. The viewpoint of the driver is at a position above the instrument panel 33 and the mobile information terminal case C and the instrument panel 33 is located in front and below the mobile information terminal case C in the side view.

The sightline V1 is a sightline in the case where the driver looks straight at an upper end of the instrument panel 33, the sightline V2 is a sightline inclined slightly downward compared to the sightline V1 and is a sightline in the case where the driver looks straight at an upper end of the mobile information terminal case C.

Taking a look at the sightline V2, a substantial lower end of the instrument panel 33 is located on the sightline V2 and most of a lower portion of the instrument panel 33 is not hidden by the mobile information terminal case C. Accordingly, visibility of the instrument panel 33 is secured.

In this respect, it can be said that an angle θ1 (hereafter, referred to as first angle of view θ1) in the drawing is a view range of the driver for the instrument panel 33 in the side view. To be precise, the first angle of view θ1 is an angle formed by the sightline V1 in the case where the driver looks straight at the upper end of the instrument panel 33 and the sightline V2 in the case where the driver looks straight at the upper end of the mobile information terminal case C (the substantial lower end of the instrument panel 33) in the side view.

Moreover, when the substantial lower end of the instrument panel 33 is located on the sightline V2 as described above, the driver can see the upper end of the mobile information terminal case C when looking straight at the substantial lower end of the instrument panel 33. This means that the visibility of the mobile information terminal P is also secured.

In other words, in the embodiment, the mobile information terminal case C does not affect the visibility of the instrument panel 33 and the case C is held at such a position that the driver can easily view the mobile information terminal P. In this example, the positional relationship between the instrument panel 33 and the mobile information terminal case C on the sightline V2 is defined based on the state where the mobile information terminal case C is inclined frontward in a direction closest to the horizontal direction.

The sightline V3 is a sightline in the case where the driver looks at a lower end of the mobile information terminal case C and is a sightline inclined slightly downward compared to the sightline V2. Moreover, an angle θ2 (hereafter, referred to as second angle of view θ2) is a substantial view range of the driver for the mobile information terminal case C in the side view. Specifically, the second angle of view θ2 is an angle formed by the sightline V2 in the case where the driver looks straight at the upper end of the mobile information terminal case C and the sightline V3 in the case where the driver looks straight at the lower end of the mobile information terminal case C in the side view.

In the embodiment, since the mobile terminal case C is held to extend from the rear to the front in a frontward and upward direction, the second angle of view θ2 can be made small. The driver can thus easily view the entire mobile information terminal P.

In the embodiment, as is apparent from FIG. 18, the relationship of first angle of view θ1+ second angle of view θ2<90° is established.

The straight line LP in the drawing shows an extending direction of the instrument panel 33 which extends frontward and upward in a side view in a display portion plane direction of the instrument panel 33 and the straight LC in the drawing shows an extending direction of the mobile information terminal case C which extends frontward and upward in a side view in a plane direction of the mobile information terminal case C.

Reference sign θα in the drawing denote a first eye point angle formed by the sightline V1 and the straight line LP in the side view and reference sign θβ denote a second eye point angle formed by the sightline V2 and the straight line LC in the side view.

Reference sign θα' in the drawing denotes a panel inclination angle formed by the straight line LP and a horizontal sightline H in the case where the driver looks straight ahead in the horizontal direction parallel to the ground surface in the side view. Reference sign θβ' in the drawing denotes a terminal inclination angle formed by the straight line LC and the horizontal sightline H in the case where the driver looks straight ahead in the horizontal direction parallel to the ground surface in the side view. Reference sign ve denotes a vertical line orthogonal to the horizontal sightline H at the view point of the driver.

In the embodiment, relationships of 90°≤θα≤180° and 90°≤θβ≤180° are established. Moreover, a relationship of θα'>θβ' is also established. Specifically, there is established a relationship in which the mobile information terminal case C is inclined frontward with respect to the vertical line ve in the side view at a greater degree than the instrument panel 33.

The definitions of the angles described above are based on the upper end and the lower end of the mobile information terminal case C. However, since the mobile information terminal P is housed inside the mobile information terminal case C in the embodiment, the definitions are established as described above even if the mobile information terminal case C is removed and the definitions are made based on an upper end and a lower end of the mobile information terminal P.

Figure 7:
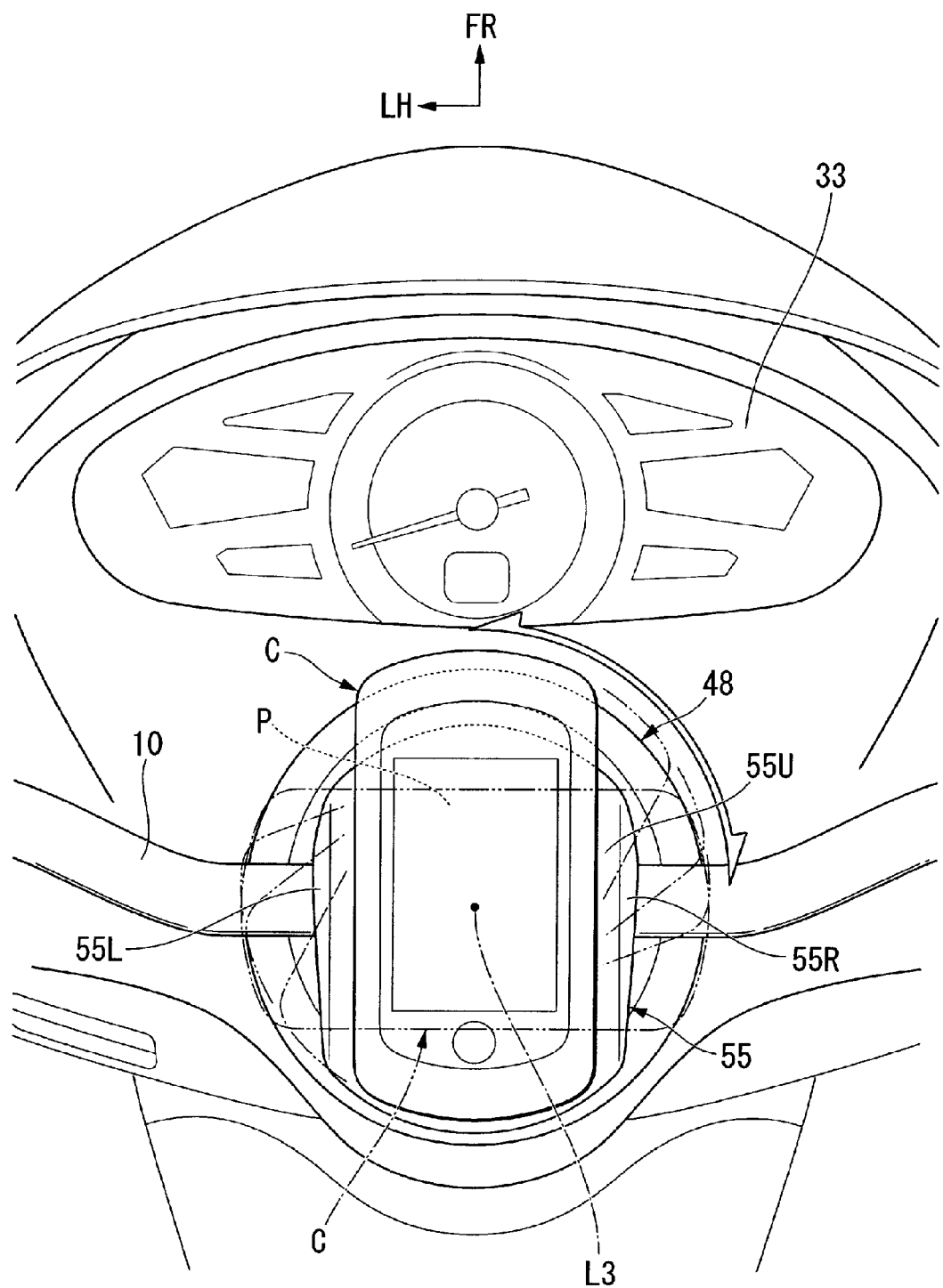
FIG. 7 is a view looking down at the portion around the handle from above the vehicle in an oblique frontward and downward direction in the state where the mobile information terminal is attached to the mobile terminal holder.

Referring to FIGS. 6 and 8A, in the state where the mobile information terminal case C is attached to the mobile terminal holder 55, the mobile information terminal case C can be swung upward and downward by turning the supporting body 60 about the first shaft portion 59 (axis L2) in the mobile terminal holder 55. Moreover, referring to FIGS. 7 and 8A, the mobile information terminal case C can be turned in the right and left directions by turning the base portion 62 about the axis L3 of the supporting body 60. Such turn adjustment enables the mobile information terminal P to be set at a posture preferable to the user.

When the mobile information terminal case C is to be removed from the mobile terminal holder 55, the mobile information terminal case C can be easily removed by sliding the first locking portion 63 and then inclining the mobile information terminal case C.

In the embodiment of the present invention described above, the wireless charging structure in a vehicle includes: the mobile information terminal case C which covers the mobile information terminal P; and the mobile terminal holder 55 which is a supporting part provided on the vehicle side and configured to support the mobile information terminal case C, the wireless charging structure configured to wirelessly charge the mobile information terminal P in the mobile information terminal case C in the state where the mobile information terminal case C is supported by the mobile terminal holder 55. In the wireless charging structure, the receiving coil 160 configured such that current flows therethrough along with a passage of magnetic flux therethrough and the reception control unit 161 electrically connected to the receiving coil 160 are provided inside the outer wall of the mobile information terminal case C, the transmitting coil 56 configured such that magnetic flux is generated by a flow of current therethrough and the transmission control unit 70 electrically connected to the transmitting coil 56 are provided on the vehicle side, the transmitting coil 56 is provided on the inner side of the portion (base portion 62) of the mobile terminal holder 55 which faces the receiving coil 160 in the state where the mobile information terminal case C is supported by the mobile terminal holder 55, the inverter part 174 which converts direct current supplied from the battery B provided on the vehicle side to alternating current and supplies the direct current to the transmitting coil 56 is provided in the transmission control unit 70, and the converter part 175 configured to convert alternating current flowing through the receiving coil 160 due to the magnetic flux generated by the transmitting coil 56 to direct current is provided in the reception control unit 161.

In this a structure, wireless charging is employed, the transmitting coil 56 is covered with the mobile terminal holder 55, and the receiving coil 160 is covered with the mobile information terminal case C. The charging structure for the mobile information terminal P can be thereby formed as simple as possible. Moreover, a transmission reception portion (portion between the transmitting coil 56 and the receiving coil 160) can be suitably protected from raindrops and the like.

In the embodiment, the paired first locking portion 63 and the second locking portion 64 configured to lock the mobile information terminal case C are provided in the mobile terminal holder 55, and the transmitting coil 56 is provided between the first locking portion 63 and the second locking portion 64.

In this configuration, the first locking portion 63, the second locking portion 64, and the transmitting coil 56 are grouped together. Accordingly, the mobile terminal holder 55 can be made compact. In addition, one (second locking portion 64) of the first locking portion 63 and the second locking portion 64 is fixed and the other one (first locking portion 63) is configured to be movable against the biasing force of the coil spring 63C which is the elastic member while being biased by the coil spring 63C. Accordingly, attachment of the mobile information terminal case C to the mobile terminal holder 55 can be facilitated.

Furthermore, the mobile terminal holder 55 includes the recessed portion 65 being a mounting portion on which the transmitting coil 56 is mounted, and the coil spring 63C is in contact with the holding plate portion 63B extending downward from the end portion of the recessed portion 65 at one end and biases the first locking portion 63 at the other end. In this case, the portion to be the mounting portion for the transmitting coil 56 and the portion to be in contact with the coil spring 63C are the same member and the number of parts can be thereby reduced.

In the embodiment, the motorcycle 1 includes the steering system S in which the steering shaft 9 is steerably supported by the vehicle body frame 11, the steering shaft 9 connected to the front forks 7 by which the front wheel 6 is rotatably supported, and in which the handle pipe 10 is fixed to the handle holder 40 provided in the upper portion of the steering shaft 9. In the motorcycle 1, the mobile terminal holder 55 is disposed above the center position of the handle pipe 10 in the vehicle width direction. In this case, the mobile information terminal P can be charged in the saddle ride vehicle. In addition, the mobile terminal holder 55 for the mobile information terminal P is disposed above the center position of the handle pipe 10 in the vehicle width direction. This secures excellent visibility of the mobile information terminal P when the mobile information terminal P is held.

In the embodiment, the handle cover 48 disposed close to the handle holder 40 and covering the portion of the steering system S below the handle holder 40 from above is fixed to the steering shaft 9, and the transmission control unit 70 is disposed on the handle cover 48. Thus, the handle pipe 10 can be attached and detached without removing the transmission control unit 70 from the handle cover 48. Accordingly, good workability of works such as attachment and detachment of the handle pipe 10 can be maintained. Moreover, since the transmission control unit 70 is disposed at a position relatively close to the mobile terminal holder 55 for the mobile information terminal case C disposed above the handle pipe 10, routing of the wires is facilitated. In addition, it is easier to protect the transmission control unit 70 with the handle cover 48.

In the embodiment, the handle holder 40 includes the lower and upper holders 41L, 42L which are a left holder and the lower and upper holders 41R, 42R which are a right holder, the left holder and the right holder disposed respectively on the left and right sides of the steering shaft 9, and the transmission control unit 70 is disposed in such a way that at least part of the transmission control unit 70 is located between the group of the lower and upper holders 41L, 42L and the group of the lower and upper holders 41R, 42R in the view in the axial direction of the steering shaft 9 and that at least part of the transmission control unit 70 is located behind the straight line connecting the front end of the group of the lower and upper holders 41L, 42L and the front end of the group of the lower and upper holders 41R, 42R in the view in the axial direction of the steering shaft 9. Due to this, the transmission control unit 70 can be disposed as close as possible to the steering shaft 9. Since the transmission control unit 70 is disposed close to a turning center portion of the steering system S, swinging of the harness between the transmission control unit 70 and the battery B can be reduced.

Moreover, since the relay cord 74 connecting the transmission control unit 70 and the battery B to each other is routed on the front side of the steering shaft 9, swinging of the relay cord 74 can be suppressed. Furthermore, since the mobile information terminal case C is supported by the mobile terminal holder 55 to be turnable in upward, downward, rightward, and leftward directions, the direction of the mobile information terminal P can be turned and adjusted. Thus, the usability can be improved.

Figure 19:
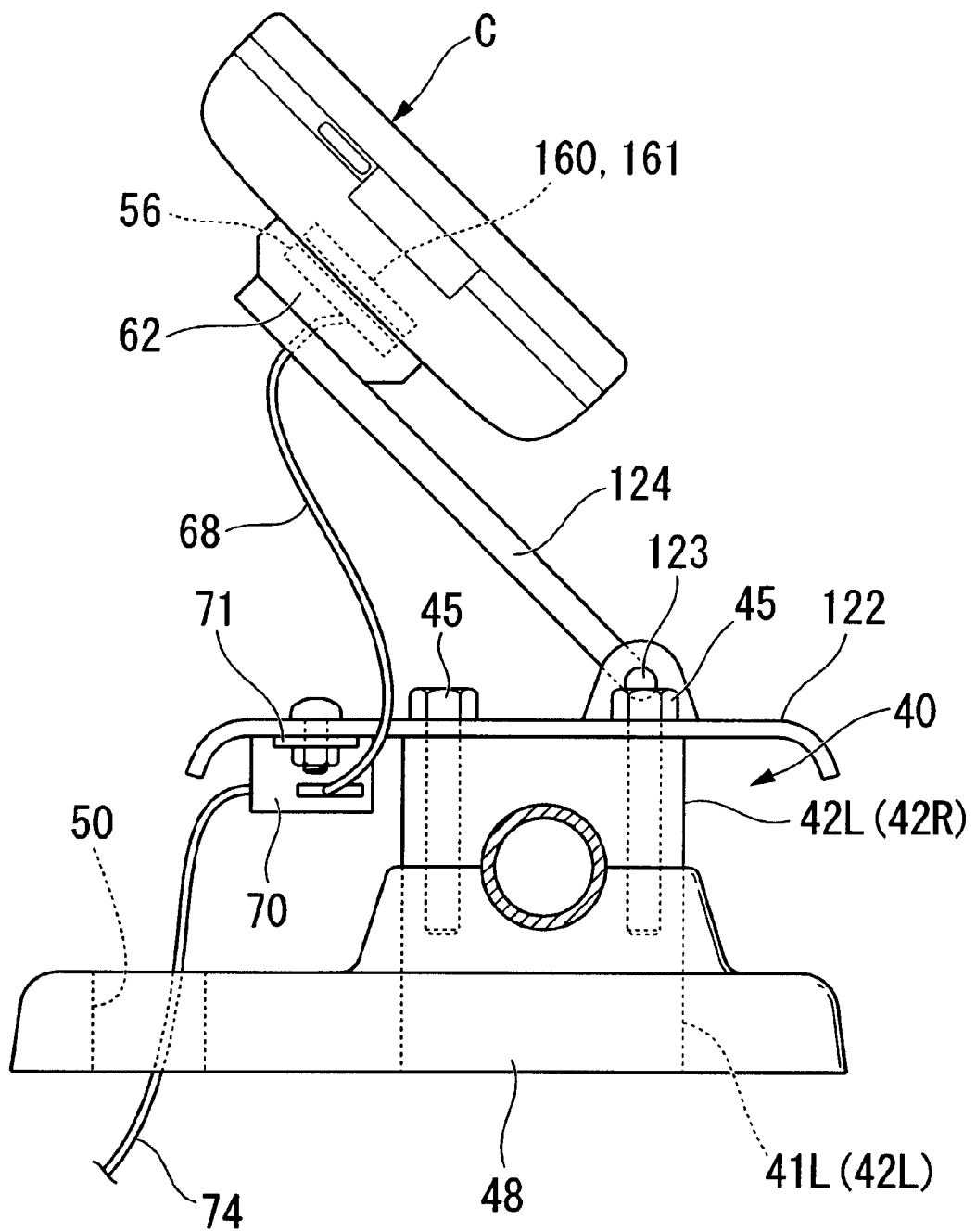
FIG. 19 is a view for explaining modified example 1 of the embodiment.

Next, description is given of modified example 1 of the embodiment by using FIG. 19. In the modified examples described below, components similar to those in the embodiment are denoted by the same reference numerals and detailed description thereof is omitted. Moreover, directions are based on the direction of the vehicle.

In modified example 1, a plate-shaped eaves member 122 is disposed on the upper portion of the upper holders 42L, 42R. The eaves member 122 is fixed with bolts 45 . . . and protrudes outside the upper holders 42L, 42R to the front, rear, right, and left. A stay 124 turnable about a turning shaft 123 extending in the vehicle width direction is supported on an upper surface of the eaves member 122 and a base portion 62 similar to one described in the aforementioned embodiment is fixed to an distal end of the stay 124 with the first locking portion 63 and the second locking portion 64 facing the driver.

In modified example 1, the transmission control unit 70 is fixed to a lower surface of the eaves member 122 and is covered with the eaves member 122 from above. The flange portions 71 of the transmission control unit 70 come in contact with a lower surface of the eaves member 122 and the transmission control unit 70 is fixed to the eaves member 122 by using bolts inserted in the flange portions 71.

In the mode of modified example 1, the eaves member 122 covering the transmission control unit 70 from above is fixed to the handle holder 40 and the transmission control unit 70 can be thereby protected from rain and the like. Moreover, the transmission control unit 70 is fixed to the eaves member 122. Accordingly, the eaves member 122 and the transmission control unit 70 can be assembled together as a small unit and then fixed to the handle holder 40. Hence, the workability of assembly can be improved.

Figure 20:
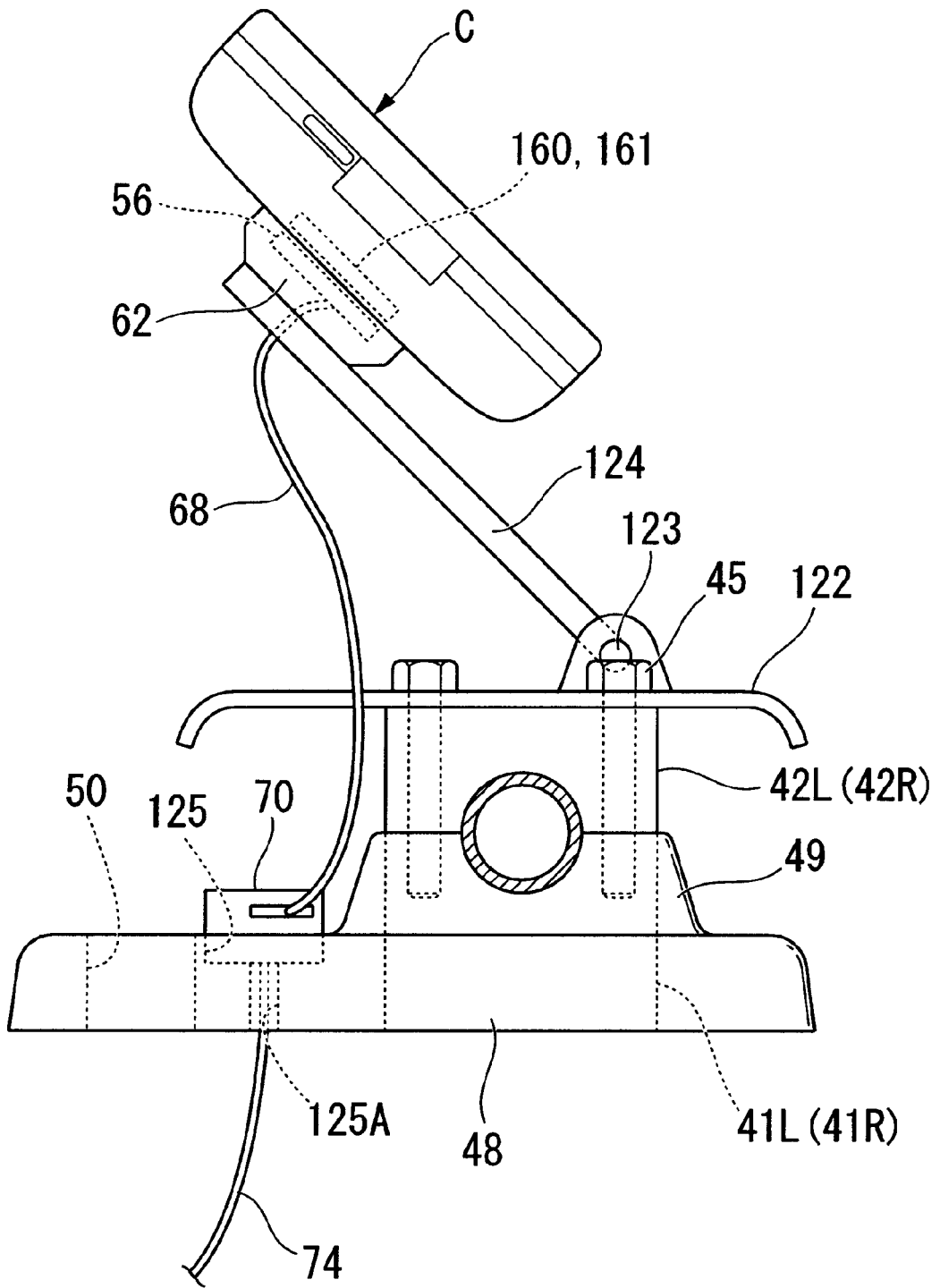
FIG. 20 is a view for explaining modified example 2 of the embodiment.

Next, description is given of modified example 2 of the embodiment by using FIG. 20. In modified example 2, the transmission control unit 70 is not attached to the eaves member 122 of aforementioned modified example 1. Instead, a hole portion 125 recessed downward is formed in an upper portion of the handle cover 48 and the transmission control unit 70 is housed in the hole portion 125. Meanwhile, the eaves member 122 only functions as a member covering the transmission control unit 70 from above. Moreover, a penetrating hole 125A which penetrates the cover 48 and which is used for wiring of the relay cord 74 extending from the transmission control unit 70 is formed below the hole portion 125. In the mode of modified example 2 as described above, the transmission control unit 70 can be held stably.

Figure 21:
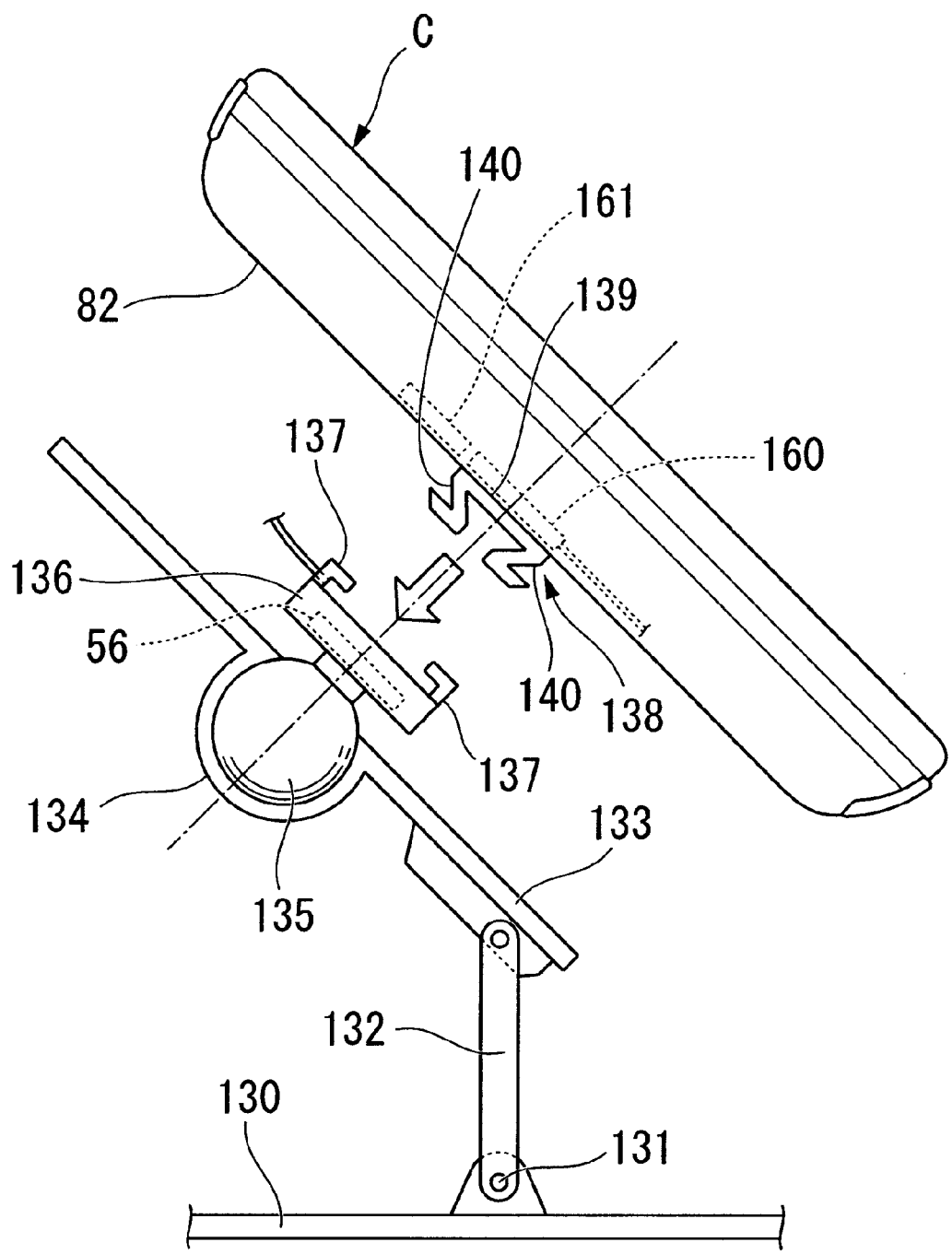
FIG. 21 is a view for explaining modified example 3 of the embodiment.

Next, description is given of modified example 3 of the embodiment by using FIG. 21.

As shown in FIG. 21, in modified example 3, a mobile terminal holder includes: a base plate 130 which is attached to the handle holder 40; a stay 132 which is turnably supported by a turning shaft 131 disposed to extend in the vehicle width direction on the upper surface of the base plate 130; a holding plate 133 which is fixed to the distal end of the stay 132; a ball joint portion 135 which is fitted to a spherical receiving portion 134 formed in the holding plate 133 in such a way as to be swingable and to be capable of maintaining a posture in a certain state and which is partially exposed from the spherical receiving portion 134; a circular-plate-shaped base portion 136 connected to a portion of the ball joint portion 135 exposed from the spherical receiving portion 134; and paired locking pieces 137, 137 which stands on the base portion 136.

The ball joint portion 135 is made of an elastic material and press fitted into the spherical receiving portion 134. The locking pieces 137, 137 are each formed to have an L-shaped cross section and stand on the base portion 136 with one end portions thereof connected to the base portion 136 and other end portions thereof facing each other. In this example, the transmitting coil 56 is provided inside the base portion 136. The transmitting coil 56 is located between the paired locking pieces 137, 137. The transmission control unit 70 not illustrated is provided in the handle cover 48 but may be provided in a different portion.

Meanwhile, the mobile information terminal case C includes a locked piece 138 configured to be locked to the paired locking pieces 137, 137 on the back surface wall portion 82. The locked piece 138 includes a plate-shaped base portion 139 fixed in contact with the back surface wall portion 82 and paired claw portions 140, 140 standing on the base portion 139 and each having a L-shaped cross section. The paired claw portions 140, 140 are formed in such a shape that portions from the base portion 139 to bent portions extend in directions coming close to each other while portions from the bent portions to distal ends extend in directions away from each other. Moreover, the distal ends of the paired claw portions 140, 140 are formed to have surfaces inclined with respect to an axis passing through an intermediate position between the claw portions 140, 140 and extending in the standing direction of the claw portions 140, 140, the surfaces inclined in such a way that the surfaces becomes gradually closer to the axis toward the outer ends in the standing direction. The receiving coil 160 is provided inside the back surface wall portion 82 at a position on the back side of the base portion 139. The reception control unit 161 is provided at a position offset from the receiving coil 160 as in the first embodiment.

In modified example 3, when the mobile information terminal case C is to be attached to the mobile terminal holder, locking is achieved by pressing the paired claw portions 140, 140 into a space between the paired locking pieces 137, 137. In this case, since the claw portions 140, 140 are formed in such a shape that the portions from the base portion 139 to the bent portions extend in the directions coming close to each other, it is possible to easily bend the claw portions 140, 140 and smoothly lock the distal ends of the claw portions 140, 140 to the inner side of the locking pieces 137, 137 by bringing the inclined surfaces of the distal ends of the claw portions 140, 140 in contact with the locking pieces 137, 137, respectively.

Next, description is given of modified example 4 of the embodiment by using FIG. 22.

In modified example 4, the arrangement of the transmitting coil 56, the receiving coil 160, the reception control unit 161, and the like are different from that of the aforementioned embodiment.

Figure 22A:
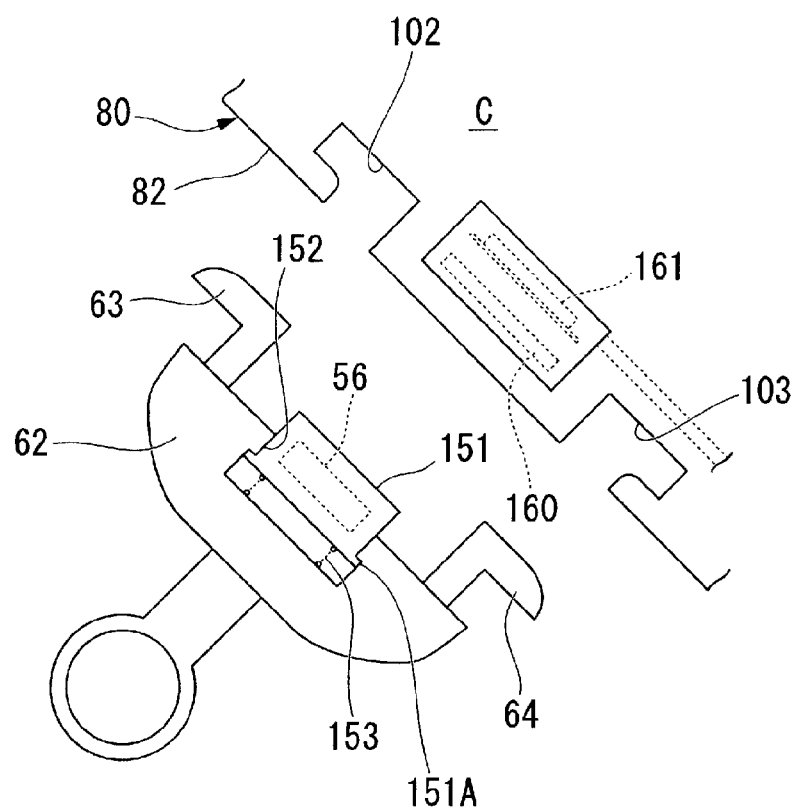
FIG. 22A is a view for explaining modified example 4 of the embodiment and is a view showing a state before the mobile information terminal case is attached to the mobile terminal holder.

As shown in FIG. 22A, in modified example 4, an electric power supplying portion 151 housing the transmitting coil 56 is provided in the base portion 62 at a position between the first locking portion 63 and the second locking portion 64 in a direction in which the first locking portion 63 and the second locking portion 64 are arranged. The electric power supplying portion 151 is inserted in a hole portion 152 formed in the base portion 62. A spring 153 is provided between a bottom portion of the hole portion 152 and the electric power supplying portion 151. The electric power supplying portion 151 is held to be pushable toward the bottom portion of the hole portion 152 while being biased by the spring 153. Moreover, the transmitting coil 56 is configured such that current from the battery B can flow therethrough. Reference numeral 151A in the drawing denotes a stopper protruding outward from an outer peripheral surface of the electric power supplying portion 151. The stopper 151A prevents the electric power supplying portion 151 from jumping out from the hole portion 152. In this example, both of the first locking portion 63 and the second locking portion 64 are fixed.

Meanwhile, in the mobile information terminal case C, the receiving coil 160 and the reception control unit 161 are provided in the back surface wall portion 82 of the case main body 80. In the back surface wall portion 82, the receiving coil 160 is arranged on the outer side which is the mobile terminal holder 55 side while the reception control unit 161 is arranged on the inner side of the receiving coil 160.

Figure 22B:
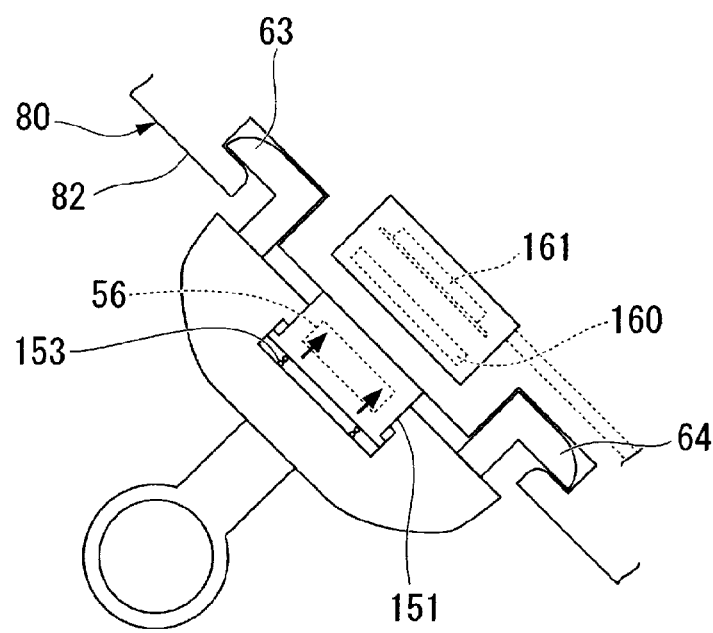
FIG. 22B is a view for explaining modified example 4 of the embodiment and is a view showing a state where the mobile information terminal case is attached to the mobile terminal holder.

In the mode of modified example 4, as shown in FIG. 22B, when the mobile information terminal case C is attached to the mobile terminal holder, the electric power supplying portion 151 comes in contact with the back surface wall portion 82 of the case main body 80 while being biased. Then, current is made to flow through the transmitting coil 56 and magnetic flux generated by this current flow is made to pass through the receiving coil 160. This causes the current to flow through the receiving coil 160 and electric power can be supplied to the charging connector 100. Modified example 4 described above has an excellent waterproof performance. Moreover, since the electric power supplying portion 151 is biased and comes in contact with the case main body 80, the charging state can be maintained in an excellent state.

Figure 23:
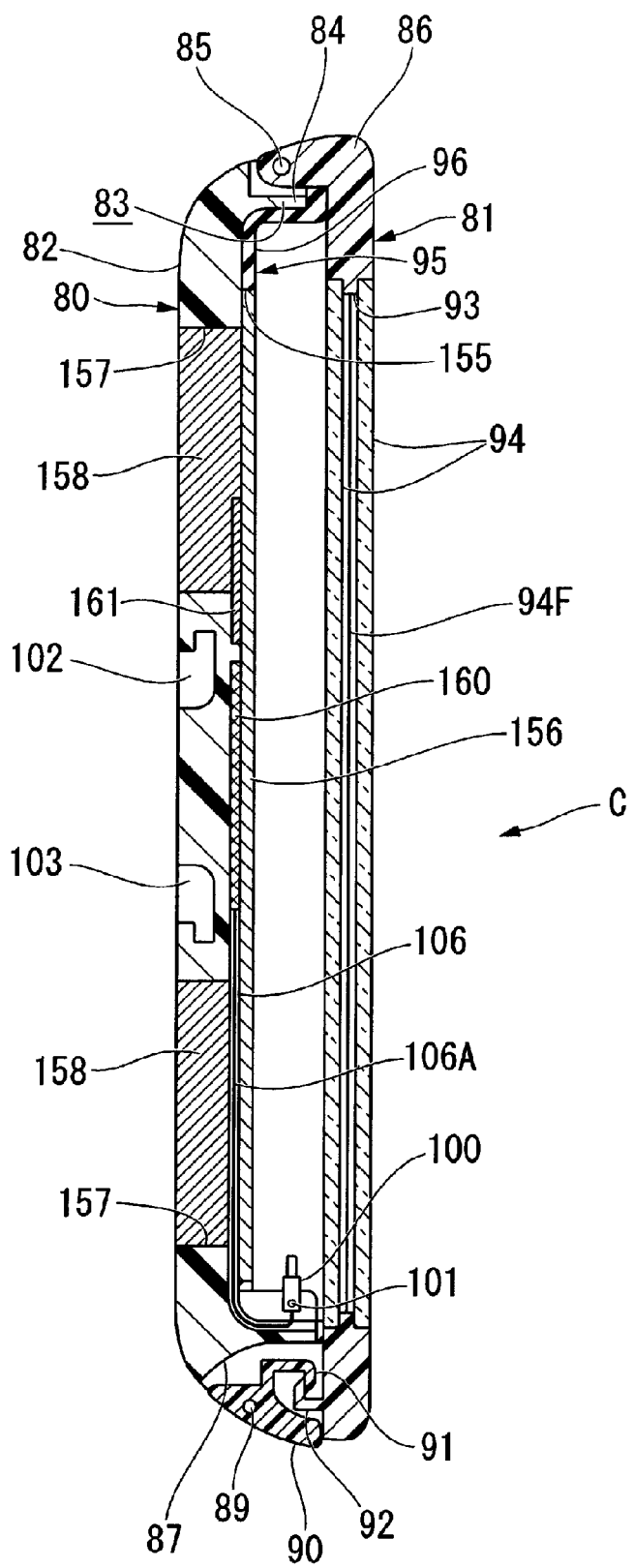
FIG. 23 is a view for explaining modified example 5 of the embodiment.

Next, description is given of modified example 5 of the embodiment by using FIG. 23.

In modified example 5, the structure of the mobile information terminal case C is different from that of the aforementioned embodiment. Structures other than this are the same as those of the aforementioned embodiment.

As shown in FIG. 23, in modified example 5, an opening 155 having, for example, a rectangular shape is formed in the back-surface contacting wall portion 96 of the spacer 95 and the inner surface of the back surface wall portion 82 of the case main body 80 is exposed to the housing space of the case main body 80 through the opening 155. A heat conductive sheet 156 having substantially the same shape as the opening 155 is provided in the opening 155. The heat conductive sheet 156 is configured to come in contact with the back surface of the mobile information terminal P when the mobile information terminal P is housed. The heat conductive sheet 156 is made of, for example, a material including silicone and the like.

Meanwhile, paired openings 157, 157 having, for example, rectangular shapes are formed in the back surface wall portion 82 of the case main body 80 on both sides of a region in which the first locking hole 102 and the second locking hole 103 are provided. The housing space of the case main body 80 is continuous with the outside through the openings 157, 157. Moreover, heat dispersing members 158, 158 are provided in the openings 157, 157. The heat dispersing members 158, 158 are configured such that surfaces thereof on the side closer to the housing space of the case main body 80 come in contact with the heat conductive sheet 156 and that surfaces thereof on the side closer to the outside of the case main body 80 are flush with the outer surface of the back surface wall portion 82. For example, members made of aluminum alloy or the like which has excellent heat dispersing performance are preferably used as the heat dispersing members 158.

As described above, in modified example 5, the heat of the mobile information terminal P housed in the case main body 80 is dispersed to the outside through the heat conductive sheet 156 and the heat dispersing members 158, 158. Accordingly, such a configuration can be used effectively particularly in a relatively-high-temperature environment in a saddle ride vehicle and the like.

In this example, the spacer 95 is provided. However, in a case where no spacer 95 is provided, the heat dispersing members 158 are provided in the openings 157 in such a way that the surfaces of the heat dispersing members 158 on the housing space side comes in contact with the back surface of the mobile information terminal P when the mobile information terminal P is housed.

Figure 24A:
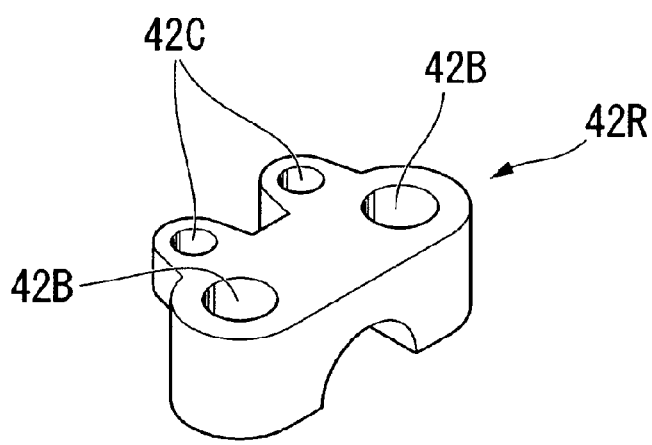
FIG. 24A is a view for explaining modified example 6 of the embodiment and is a perspective view of the handle holder.
Figure 24B:
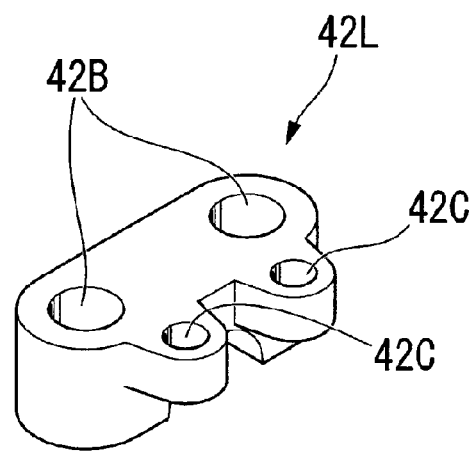
FIG. 24B is a view for explaining modified example 6 of the embodiment and is a perspective view of the handle holder.

Next, FIGS. 24A and 24B are views showing modified example 6. In this modified example, bolt fastening holes 42C different from the penetrating holes 42B of the upper holders 42L, 42R are formed at positions outside the penetrating holes 42B. The pedestal part 55A of the mobile terminal holder 55 is fastened to the upper holders 42L, 42R by using the bolt fastening holes 42C.

The embodiment of the present invention has been described above. However, the present invention is not limited to the embodiment described above and various changes such as the modified examples described above can be made to the invention within the scope not departing from the sprit of the present invention.

Modified examples other than the modified examples described above include the following examples. Although, the two transparent plate materials 94, 94 are provided in the window portion 93 of the lid member 81 in the embodiment described above, only one transparent plate material 94 is provided and a film of anti-fog material is formed on the transparent plate material 94 as a measure against fogging. For example, a solvent containing surfactant and the like can be used as the anti-fog material. Moreover, the transparent plate material 94 may be made of a conductive material to enable usage of a touch panel.

In the embodiment described above, as shown in FIG. 8A, description is given of the example in which the transmission control unit 70 is disposed on the upper surface of the rear half 47 of the handle cover 48, between the left and right lower holders 41L, 41R in the view in the direction of the steering axis L1, in such a way that part of the transmission control unit 70 is located behind the straight line connecting the front ends of the left and right lower holders 41L, 41R. However, the transmission control unit 70 may be arranged in a front portion of the handle cover 48.

In this case, a cord connecting the battery B and the transmission control unit 70 can be made shorter when the cord is routed on the front side of the steering shaft. In addition, it is possible to prevent the case where the cord is pulled due to steering and thereby swings. Hence, the protection of the cord can be easily improved.

The mobile information terminal P in the embodiment described above is assumed to be a so-called smartphone. However, the mobile information terminal in the present invention is intended to include, in addition to smartphones, information terminals such as tablet terminals and navigation devices capable of receiving electric power supply.

A wireless charging structure for a mobile information terminal in a vehicle according to a first aspect of the embodiment, includes: a mobile information terminal case (C) covering a mobile information terminal (P); and a supporting part (55) provided on a vehicle side and configured to support the mobile information terminal case (C), the wireless charging structure configured to wirelessly charge the mobile information terminal (P) in the mobile information terminal case (C) in the state where the mobile information terminal case (C) is supported by the supporting part (55), wherein: a receiving coil (160) and a reception control unit (161) are provided inside an outer wall of the mobile information terminal case (C), the receiving coil (160) configured such that current flows therethrough along with a passage of magnetic flux therethrough, the reception control unit (161) electrically connected to the receiving coil (160); and a transmitting coil (56) and a transmission control unit (70) are provided on the vehicle side, the transmitting coil (56) configured such that magnetic flux is generated by a flow of current therethrough, the transmission control unit (70) electrically connected to the transmitting coil (56), the transmitting coil (56) is provided on an inner side of a portion of the supporting part (55), the portion facing the receiving coil (160) in the state where the mobile information terminal case (C) is supported by the supporting part (55), the transmission control unit (70) is provided with an inverter part (174) configured to convert direct current supplied from a battery (B) provided on the vehicle side to alternating current, and supply the alternating current to the transmitting coil (56), and the reception control unit (161) is provided with a converter part (175) configured to convert alternating current flowing through the receiving coil (160) due to the magnetic flux generated by the transmitting coil (56) to direct current.

A wireless charging structure for a mobile information terminal in a vehicle according to a second aspect of the embodiment is the wireless charging structure according to the first aspect, wherein the supporting part (55) is provided with paired locking portions (63, 64) configured to lock the mobile information terminal case (C), and the transmitting coil (56) is provided between the paired locking portions (63, 64).

A wireless charging structure for a mobile information terminal in a vehicle according to a third aspect of the embodiment is the wireless charging structure according to the second aspect, wherein the paired locking portions (63, 64) are configured, one of which is fixed and the other of which is movable against a biasing force of an elastic member (63C) while being biased by the elastic member (63C).

A wireless charging structure for a mobile information terminal in a vehicle according to a fourth aspect of the embodiment is the wireless charging structure according to the third aspect, wherein the supporting part (55) includes a mounting portion (65) on which the transmitting coil (56) is mounted, and one end of the elastic member (63C) comes in contact with a portion (63B) extending from an end portion of the mounting portion (65) and the other end of the elastic member (63C) biases the other of the paired locking portions (63, 64).

A wireless charging structure for a mobile information terminal in a vehicle according to a fifth aspect of the embodiment is the wireless charging structure according to any one of the first to fourth aspects, wherein the wireless charging structure is installed in a saddle ride vehicle including a steering system (S) in which a steering shaft (9) connected to a front fork (7) rotatably supporting a front wheel (6) is steerably supported by a vehicle body frame (11), and in which a handle pipe (10) is fixed to a handle holder (40) provided on an upper portion of the steering shaft (9), and the supporting part (55) is disposed on top of a center position of the handle pipe (10) in a vehicle width direction.

A wireless charging structure for a mobile information terminal in a vehicle according to a sixth aspect of the embodiment is the wireless charging structure according to the fifth aspect, wherein a cover member (48) disposed close to the handle holder (40) and covering a portion below the handle holder (40) in the steering system (S) from above is fixed to the steering shaft (9), and the transmission control unit (70) is disposed on the cover member (48).

A wireless charging structure for a mobile information terminal in a vehicle according to a seventh aspect of the embodiment is the wireless charging structure according to the fifth or sixth aspect, wherein the handle holder (40) includes a left holder (41L, 42L) and a right holder (41R, 42R) disposed respectively on left and right sides of the steering shaft (9), and the transmission control unit (70) is disposed in such a way that at least part of the transmission control unit (70) is located between the left holder (41L, 42L) and the right holder (41R, 42R) in a view in an axial direction of the steering shaft (9) and that at least part of the transmission control unit (70) is located behind a straight line connecting a front end of the left holder (41L, 42L) and a front end of the right holder (41R, 42R) in the view in the axial direction of the steering shaft (9).

A wireless charging structure for a mobile information terminal in a vehicle according to an eighth aspect of the embodiment is the wireless charging structure according to the sixth or seventh aspect, wherein an eaves member (122) covering the transmission control unit (70) from above is fixed to the handle holder (40).

A wireless charging structure for a mobile information terminal in a vehicle according to a ninth aspect of the embodiment is the wireless charging structure according to any one of the fifth to eighth aspects, wherein a cord (74) connecting the transmission control unit (70) and the battery (B) to each other is routed in front of the steering shaft (9).

A wireless charging structure for a mobile information terminal in a vehicle according to a tenth aspect of the embodiment is the wireless charging structure according to the fifth aspect, wherein an attachment member (122) protruding outside from the handle holder (40) is fixed to the handle holder (40), and the transmission control unit (70) is fixed to a lower surface of the attachment member (122).

A wireless charging structure for a mobile information terminal in a vehicle according to an eleventh aspect of the embodiment is the wireless charging structure according to any one of the fifth to tenth aspects, wherein the supporting part (55) supports the mobile information terminal case (C) turnably in upward, downward, rightward, and leftward directions.

According to the first aspect of the embodiment, wireless charging is employed, the transmitting coil is covered with the supporting part, and the receiving coil is covered with the mobile information terminal case. The charging structure for the mobile information terminal can be thereby formed as simple as possible. Moreover, the transmission reception portion between the transmission side and the mobile information terminal can be suitably protected from raindrops and the like.

According to the second aspect of the embodiment, the paired locking portions and the transmitting coil are grouped together. Accordingly, the supporting part can be made compact.

According to the third aspect of the embodiment, attachment of the mobile information terminal case to the supporting part can be facilitated.

According to the fourth aspect of the embodiment, a portion to be the mounting portion of the transmitting coil and a portion to be in contact with the coil spring are the same member and the number of parts can be thereby reduced.

According to the fifth aspect of the embodiment, the mobile information terminal can be charged in the saddle ride vehicle. In addition, the supporting part for the mobile information terminal is disposed above the center position of the handle pipe in the vehicle width direction. This secures excellent visibility of the mobile information terminal when the mobile information terminal is held.

According to the sixth aspect of the embodiment, the transmission control unit is disposed on the cover member fixed to the steering shaft which is a part of the steering system other than the handle pipe and which is different from the handle holder. Thus, the handle pipe can be attached and removed without removing the transmission control unit from the cover member. Accordingly, good workability of works such as attachment and detachment of the handle pipe can be maintained.

Moreover, since the transmission control unit is disposed at a position relatively close to the supporting part for the mobile information terminal case disposed above the handle pipe, routing of wires is facilitated. In addition, it is easier to protect the transmission control unit with the cover member.

According to the seventh aspect of the embodiment, the transmission control unit can be arranged as close as possible to the steering shaft. Since the transmission control unit is disposed closer to a turning center portion of the steering system, swinging of the harness between the transmission control unit and the battery can be reduced.

According to the eighth aspect of the embodiment, the transmission control unit can be protected from raindrops and the like.

According to the ninth aspect of the embodiment, swinging of the cord can be suppressed.

According to the tenth aspect of the embodiment, the transmission control unit can be protected from raindrops and the like. Moreover, since the attachment member and the transmission control unit can be assembled together in a small unit and then fixed to the handle holder, the workability of assembly can be improved.

According to the eleventh aspect of the embodiment, the direction of the mobile information terminal supported by the supporting part can be turned and adjusted and the usability is thereby improved.

Obviously, numerous modifications and variations of the present invention are possible in light of the above teachings. It is therefore to be understood that within the scope of the appended claims, the invention may be practiced otherwise than as specifically described herein.

What is claimed is:

1. A wireless charging structure for a mobile information terminal in a vehicle, comprising:
   a mobile information terminal case to cover the mobile information terminal;
   a support provided on a vehicle side to support the mobile information terminal case;
   a receiving coil through which current is to flow along with a passage of magnetic flux, the receiving coil being provided inside an outer wall of the mobile information terminal case;
   a reception controller provided inside the outer wall of the mobile information terminal case and electrically connected to the receiving coil;
   a transmitting coil through which current is to flow to generate magnetic flux, the support including a facing portion provided to face the receiving coil in a state where the mobile information terminal case is supported by the support, the transmitting coil being provided on the vehicle side and provided on an inner side of the facing portion of the support; and
   a transmission controller provided on the vehicle side and electrically connected to the transmitting coil, the transmission controller including an inverter configured to convert direct current supplied from a battery provided on the vehicle side to alternating current and to supply the alternating current to the transmitting coil, the reception controller including a converter configured to convert alternating current flowing through the receiving coil due to the magnetic flux generated by the transmitting coil to direct current, wherein
   the support includes a first locking portion and a second locking portion which are provided to lock the mobile information terminal case,
   the transmitting coil is provided between the first locking portion and the second locking portion, and
   the mobile information terminal case is supported by the support in a state where the mobile information terminal case is inclined frontward with respect to a vertical line.

2. The wireless charging structure for a mobile information terminal in a vehicle according to claim 1, wherein
   the first locking portion is fixed, and
   the second locking portion is movable against a biasing force of an elastic member while being biased by the elastic member.

3. The wireless charging structure for a mobile information terminal in a vehicle according to claim 2, wherein
   the support includes a mounting portion on which the transmitting coil is mounted,
   one end of the elastic member comes in contact with a portion extending from an end portion of the mounting portion, and
   another end of the elastic member biases the second locking portion.

4. The wireless charging structure for a mobile information terminal in a vehicle according to claim 1, wherein
   the wireless charging structure is installed in a saddle ride vehicle including a steering system in which a steering shaft connected to a front fork rotatably supporting a front wheel is steerably supported by a vehicle body frame, and in which a handle pipe is fixed to a handle holder provided on an upper portion of the steering shaft, and
   the support is disposed on top of a center position of the handle pipe in a vehicle width direction.

5. A wireless charging structure for a mobile information terminal in a vehicle, comprising:
   a mobile information terminal case to cover the mobile information terminal;
   a support provided on a vehicle side to support the mobile information terminal case;
   a receiving coil through which current is to flow along with a passage of magnetic flux, the receiving coil being provided inside an outer wall of the mobile information terminal case;
   a reception controller provided inside the outer wall of the mobile information terminal case and electrically connected to the receiving coil;
   a transmitting coil through which current is to flow to generate magnetic flux, the support including a facing portion provided to face the receiving coil in a state where the mobile information terminal case is supported by the support, the transmitting coil being provided on the vehicle side and provided on an inner side of the facing portion of the support; and
   a transmission controller provided on the vehicle side and electrically connected to the transmitting coil, the transmission controller including an inverter configured to convert direct current supplied from a battery provided on the vehicle side to alternating current and to supply the alternating current to the transmitting coil, the reception controller including a converter configured to convert alternating current flowing through the receiving coil due to the magnetic flux generated by the transmitting coil to direct current, wherein the wireless charging structure is installed in a saddle ride vehicle including a steering system in which a steering shaft connected to a front fork rotatably supporting a front wheel is steerably supported by a vehicle body frame, and in which a handle pipe is fixed to a handle holder provided on an upper portion of the steering shaft, the support is disposed on top of a center position of the handle pipe in a vehicle width direction, a cover member is disposed close to the handle holder and covers a portion below the handle holder in the steering system from above, the cover member being fixed to the steering shaft, and the transmission controller is disposed on the cover member.

6. The wireless charging structure for a mobile information terminal in a vehicle according to claim 4, wherein the handle holder includes a left holder and a right holder which are disposed respectively on left and right sides of the steering shaft, at least part of the transmission controller is located between the left holder and the right holder in a view in an axial direction of the steering shaft, and at least part of the transmission controller is located behind a straight line connecting a front end of the left holder and a front end of the right holder when viewed from the axial direction of the steering shaft.

7. The wireless charging structure for a mobile information terminal in a vehicle according to claim 4, wherein an eaves member covering the transmission controller from above is fixed to the handle holder.

8. The wireless charging structure for a mobile information terminal in a vehicle according to claim 4, wherein a cord connecting the transmission controller and the battery to each other is routed in front of the steering shaft.

9. The wireless charging structure for a mobile information terminal in a vehicle according to claim 4, wherein an attachment member protruding outside from the handle holder is fixed to the handle holder, and the transmission controller is fixed to a lower surface of the attachment member.

10. The wireless charging structure for a mobile information terminal in a vehicle according to claim 1, wherein the support supports the mobile information terminal case turnably in upward, downward, rightward, and leftward directions.

11. The wireless charging structure for a mobile information terminal in a vehicle according to claim 1, wherein the mobile information terminal case includes a case main body having a recess configured to receive the mobile information terminal and a lid to cover the mobile information terminal within the recess.

12. The wireless charging structure for a mobile information terminal in a vehicle according to claim 11, wherein the receiving coil is provided within the recess on a back surface wall portion of the case main body.

13. The wireless charging structure for a mobile information terminal in a vehicle according to claim 12, wherein a layer of material is provided in the recess on the back surface wall portion to cover the receiving coil.

14. The wireless charging structure for a mobile information terminal in a vehicle according to claim 12, wherein the reception controller is provided within the recess on the back surface wall portion of the case main body.

15. The wireless charging structure for a mobile information terminal in a vehicle according to claim 14, wherein a layer of material is provided in the recess on the back surface wall portion to cover the receiving coil and the reception controller.

16. The wireless charging structure for a mobile information terminal in a vehicle according to claim 11, wherein the receiving coil is covered by the mobile information terminal case, and wherein the lid member has a window portion with a transparent plate to allow at least a portion of the mobile information terminal to be viewable therethrough.

17. The wireless charging structure for a mobile information terminal in a vehicle according to claim 16, wherein the recess of the mobile information terminal case includes a charging connector connected to the receiving coil, and wherein the charging connector is configured to be connected to a charging port of the mobile information terminal to supply current to the mobile information terminal.

18. The wireless charging structure for a mobile information terminal in a vehicle according to claim 11, wherein the recess of the mobile information terminal case includes a charging connector connected to the receiving coil, and wherein the charging connector is configured to be connected to a charging port of the mobile information terminal to supply current to the mobile information terminal.

19. The wireless charging structure for a mobile information terminal in a vehicle according to claim 11, wherein one of the first locking portion and the second locking portion is biased in a direction away from an other of the first locking portion and the second locking portion to lock the mobile information terminal case.

20. A wireless charging structure for a mobile information terminal in a vehicle, comprising:

a mobile information terminal case to cover the mobile information terminal;

a support provided on a vehicle side to support the mobile information terminal case;

a receiving coil through which current is to flow along with a passage of magnetic flux, the receiving coil being provided inside an outer wall of the mobile information terminal case;

a reception controller provided inside the outer wall of the mobile information terminal case and electrically connected to the receiving coil;

a transmitting coil through which current is to flow to generate magnetic flux, the support including a facing portion provided to face the receiving coil in a state where the mobile information terminal case is supported by the support, the transmitting coil being provided on the vehicle side and provided on an inner side of the facing portion of the support; and a transmission controller provided on the vehicle side and electrically connected to the transmitting coil, the transmission controller including an inverter configured to convert direct current supplied from a battery provided on the vehicle side to alternating current and to supply the alternating current to the transmitting coil, the reception controller including a converter configured to convert alternating current flowing through the receiving coil due to the magnetic flux generated by the transmitting coil to direct current, wherein the wireless charging structure is installed in a saddle ride vehicle including a steering system in which a steering shaft connected to a front fork rotatably supporting a front wheel is steerably supported by a vehicle body frame, and in which a handle pipe is fixed to a handle holder provided on an upper portion of the steering shaft, the support is disposed on top of a center position of the handle pipe in a vehicle width direction, and the mobile information terminal case is supported by the support in a state where the mobile information terminal case is inclined frontward with respect to a vertical line.

* * * * *